United States Patent
Haverkamp et al.

(10) Patent No.: US 10,706,562 B2
(45) Date of Patent: Jul. 7, 2020

(54) MOTION-MEASURING SYSTEM OF A MACHINE AND METHOD FOR OPERATING THE MOTION-MEASURING SYSTEM

(71) Applicant: CARL ZEISS INDUSTRIELLE MESSTECHNIK GMBH, Oberkochen (DE)

(72) Inventors: Nils Haverkamp, Aalen (DE); Dominik Seitz, Schwaebisch Gmuend (DE); Tanja Teuber, Aalen (DE); Lars Omlor, Aalen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 137 days.

(21) Appl. No.: 15/718,156

(22) Filed: Sep. 28, 2017

(65) Prior Publication Data
US 2018/0018778 A1    Jan. 18, 2018

Related U.S. Application Data

(63) Continuation of application No. PCT/EP2016/056928, filed on Mar. 30, 2016.

(30) Foreign Application Priority Data

Mar. 30, 2015 (DE) .................. 10 2015 205 738

(51) Int. Cl.
*B23Q 17/24* (2006.01)
*G06T 7/246* (2017.01)
(Continued)

(52) U.S. Cl.
CPC .......... *G06T 7/248* (2017.01); *B23Q 17/2409* (2013.01); *G01B 5/008* (2013.01);
(Continued)

(58) Field of Classification Search
CPC .......... G06T 7/248; G06T 2207/30164; G01B 21/042; G01B 11/002; G01B 5/008; B23Q 17/2409
See application file for complete search history.

(56) References Cited

U.S. PATENT DOCUMENTS 5,053,626 A * 10/1991 Tillotson ............ G01N 21/6458
250/458.1
6,459,509 B1 * 10/2002 Maciey .................... H04N 1/12
358/406
(Continued)

FOREIGN PATENT DOCUMENTS

DE    10 2009 009 789 A1    9/2010
DE    10 2010 022 592 A1    12/2011
(Continued)

OTHER PUBLICATIONS

Ioannis M. Rekleitis; Steerable Filters and Cepstral Analysis for Optical Flow Calculation from a Single Blurred Image; May 1996; 8 pp.
(Continued)

*Primary Examiner* — Carol Wang
(74) *Attorney, Agent, or Firm* — Harness, Dickey & Pierce, P.L.C.

(57) ABSTRACT

A method for operating a motion-measuring system of a machine, such as a coordinate-measuring device or a machine tool. An image-recording device arranged on a first part of the machine records at least one recorded image of a second part of the machine. The first part and the second part can be moved in relation to each other. A capturing structure, which is formed by the second part and/or which is arranged on the second part, is captured by the at least one recorded image, and, by using information about an actual appearance of the capturing structure, a speed of the relative motion of the first part and the second part is determined (Continued)

from differences of the at least one recorded image from the actual appearance of the capturing structure.

9 Claims, 11 Drawing Sheets

(51) Int. Cl.
　　*G01B 5/008*　　(2006.01)
　　*G01B 11/00*　　(2006.01)
　　*G01B 21/04*　　(2006.01)

(52) U.S. Cl.
　　CPC .......... *G01B 11/002* (2013.01); *G01B 21/042* (2013.01); *G06T 2207/30164* (2013.01)

(56) References Cited

U.S. PATENT DOCUMENTS

| | | | |
|---|---|---|---|
| 8,139,886 B2 | 3/2012 | Szeliski et al. | |
| 2010/0119146 A1* | 5/2010 | Inazumi | G06T 5/003 382/153 |
| 2014/0301632 A1* | 10/2014 | Ikeda | G06T 7/0004 382/152 |
| 2015/0323307 A1 | 11/2015 | Ruck et al. | |

FOREIGN PATENT DOCUMENTS

| | | |
|---|---|---|
| DE | 10 2014 206 851 A1 | 3/2015 |
| DE | 10 2014 210 056 A1 | 12/2015 |
| JP | 2010-219940 | 9/2010 |
| WO | 2012/103982 A1 | 8/2012 |
| WO | 2014/090318 A1 | 6/2014 |

OTHER PUBLICATIONS

Li Xu et al.; Two-Phase Kernel Estimation for Robust Motion Deblurring; 2010; pp. 157-170.
Mauricio Delbracio et al.; The Non-parametric Sub-pixel Local Point Spread Function Estimation Is a Well Posed Problem; 2012; pp. 175-194.
ISO 12233; Photography—Electronic still-picture cameras—Resolution measurements; 2000; 40 pp.
Stephen R. Gottesman et al.; New family of binary arays for coded aperture imaging; Oct. 1989; pp. 4344-4352.
Valeriy V. Yashchuk et al.; Optical Engineering; Calibration of the modulation transfer function of surface profilometers with binary pseudorandom test standards: expanding the application range to Fizeau interferometers and electron microscopes; Sep. 2011; 13 pp.
A. Busboom et al.; Uniformly Redundant Arrays; 1998; pp. 97-123.
Jason Geng; Structured-light 3D surface imaging: a tutorial; 2011; pp. 128-160.
English translation of International Preliminary Report of Patentability (Chapter II) for PCT/EP2016/056928; 6 pp.

* cited by examiner

MOTION-MEASURING SYSTEM OF A MACHINE AND METHOD FOR OPERATING THE MOTION-MEASURING SYSTEM

CROSS-REFERENCES TO RELATED APPLICATIONS

This application is a continuation of international patent application PCT/EP2016/056928, filed on Mar. 30, 2016 designating the U.S., which international patent application has been published in German and claims priority from German patent application DE 10 2015 205 738.0, filed on Mar. 30, 2015. The entire contents of these prior applications are incorporated herein by reference.

BACKGROUND OF THE INVENTION

The invention relates to a motion-measuring system of a machine, a machine comprising a motion-measuring system, a method for operating a motion-measuring system of a machine, and a method for operating a machine comprising a motion-measuring system.

Machines, such as e.g. coordinate measuring machines or machine tools, usually have a movable part, which e.g. carries a sensor for capturing coordinates of a workpiece or carries a processing tool for processing a workpiece. The movable part is therefore a sensor carrier, in particular. The movable part is movable within a movement range relative to another part of the machine, e.g. relative to a base.

By way of example, the sensor of the coordinate measuring machine (for short: CMM) is a measuring head mounted on the movable part (for example a sleeve or an arm) of the CMM. On the measuring head it is possible to mount a probe (e.g. a probe pin), in particular, using which the CMM probes the surface of the workpiece in a tactile manner in order to generate the sensor signals of the measuring head. Therefore, in particular, a probe for the tactile probing of the workpiece to be measured is also an example of a sensor or of a part of the sensor.

The measuring head has a sensor system, in particular, which generates measurement signals whose evaluation enables the coordinates to be determined. However, other sensors also crop up in coordinate measuring technology. By way of example, the sensor may merely initiate the measurement of the coordinates. This is the case for example for a switching measuring head which generates a switching signal upon contact with the workpiece to be measured, which switching signal initiates the measurement of the coordinates e.g. by reading off the scales of the movable part or parts of the CMM. In principle, the sensors can be classified into sensors that carry out measurement by contact (tactile probing of the workpiece) and sensors that do not carry out measurement by contact. By way of example, optical or capacitive sensors for coordinate measurement are sensors which are not based on the principle of tactile probing. Furthermore, it is known to use invasive radiation, penetrating into the interior of the measurement object, for coordinate measurement. Moreover, it is possible to classify sensors according to the type or size of the in particular simultaneously detected region of the workpiece. In particular, sensors may measure coordinates just of a point or of an area on the surface or else in the interior of the workpiece or measure coordinates of a volume of the workpiece. By means of computed tomography, for example, a three-dimensional image of the measurement object can be created from measurement results of radiation detectors. In addition, it is possible to use different sensors simultaneously on the same sensor carrier or on different sensor carriers, either as separate units or integrated into a common unit. The different sensors can employ identical and/or different measurement principles.

It is customary to configure a CMM such that the sensor can be exchanged for a different sensor. In this case, that part of the CMM which has the interface for mounting the respective sensor can be referred to as a sensor carrier. However, that part of the coupled sensor which is immobile relative to the coupling interface in the coupled state can also be referred to as part of the sensor carrier. Moreover, as e.g. in the already mentioned case of a measuring head with a tactile probe mounted thereon, it is possible for two different parts to be designated in each case as a sensor. If one sensor carries the other sensor, said one sensor can be referred to as a sensor carrier of the other sensor.

The sensor serves for capturing coordinates of a workpiece. Signals generated by the sensor from a scan of the workpiece are not sufficient by themselves, however, to be able to determine the coordinates of the workpiece in the coordinate system of the coordinate measuring machine. Information about the position and/or alignment of the sensor is additionally required for this purpose. The CMM therefore has a position determining device for ascertaining a position and/or an alignment of the sensor carrier carrying the sensor and thus of the sensor. Additional motion-measuring devices are usually combined with the movable parts of the CMM. By way of example, a material measure, for example a scale graduation with lines, is arranged on one part of the CMM and a measurement signal transducer is arranged on a second part of the CMM, said second part being movable relative to said first part.

An evaluation device of the CMM determines coordinates of the workpiece from a position and/or alignment of the sensor carrier as ascertained by the position determining device and from signals of the sensor. When the term position determination is used in this description, it should be understood alternatively or additionally to mean a determination of an alignment of the respective part or region, unless different substantive matter is evident from the context.

The position determination of the sensor carrier depends on external influences and the respective operating state of the CMM. By way of example, the temperature and air humidity influence the position determination. Furthermore, the weight force of a sensor coupled to the sensor carrier must be taken into account. Moreover, parts of the CMM may flex depending on the position of the sensor carrier. The speed of the movement of the movable parts of the CMM and the acceleration likewise influence the position measurement. CMMs are therefore calibrated for specific ambient conditions and operating states. Care must then be taken to ensure that the ranges of the influencing variables that are taken into account in the calibration are not left during operation of the CMM. The complexity for the calibration and the corresponding correction models is high on account of the multiplicity of influencing variables. Furthermore, the uncertainty that remains, despite the correction, in the measurement variables measured by the CMM differs in magnitude in different subranges of the influencing variables. Moreover, the behavior of the CMM changes over the course of time, with the result that the calibration must be repeated.

With the exception of the differences between the coordinate measurement and the workpiece processing, the statements about the position determination analogously also apply to machine tools having a tool carrier which is movable in a movement range and which carries or can carry a processing tool. Such machine tools, too, usually have a position determining device.

The calibration of the position determining device can be at least simplified if an optical position determination takes place by camera images being recorded by at least one camera. By evaluating the camera images, given suitable configuration and arrangement of the camera or cameras, it is possible to determine the position of the movable part with high accuracy. As an alternative or in addition to the position determination with at least one camera, it is possible to use a position determining device with a non-imaging optical sensor system, for example with a correlation sensor.

As already mentioned, other motion-measuring devices are also customary, however, particularly in coordinate measuring machines. Their measurement results are used in particular for controlling the movement e.g. in accordance with a predefined movement sequence. Alongside the motion-measuring devices with a scale graduation as already mentioned, tachometers are usually used, too, which measure the movement of motors of the machine, in particular directly. The tachometer signals can be used directly by the motor controller. However, they can e.g. also be transmitted as redundant measurement results of the movement to a superordinate controller of the machine.

High-precision motion-measuring devices such as are required as part of coordinate measuring machines and machine tools are comparatively complex in their production and must be calibrated.

It is an object of the present invention to specify a motion-measuring system of a machine, a machine comprising a motion-measuring system, a method for operating a motion-measuring system of a machine and/or a method for operating a machine comprising a motion-measuring system in which the complexity for production and calibration can be reduced.

SUMMARY OF THE INVENTION

The object is achieved on the basis of a measuring system comprising an image recording device, which measuring system is e.g. also usable as a position measuring system for measuring the position of a movable machine part. The measuring system has at least one image recording device, which is referred to as a camera in the description even if the image recording device is not combined with an optical lens device. By way of example, so-called LSS (Lensless Smart Sensors) are commercially available which are suitable as image recording device. The image recording device is arranged on a first part of the machine and records at least one recording image (also referred to hereinafter as camera image, without any restriction of generality) of a second part of the machine or is configured to record at least one camera image of the second part of the machine.

A recording image is therefore understood to mean information about an imaged scene which is/was generated by the image recording device, wherein image values (for example binary values, gray-scale values or color values) are defined in relation to an image coordinate system. Even though preferred, the recording image need not be the image of an optical lens or lens arrangement. Rather, other types of imagings are also appropriate, for example by means of gratings or masks. In particular, however, the type of imaging is taken into account in the evaluation of the recording image.

In the event of a relative movement of the first and second parts, a problem that is generally known when photographing moving objects occurs, namely the blurring of structures in the recorded camera image. By way of example, a sharp transition (edge) from a bright, white or strongly reflective structure region to a dark, black or weakly reflective structure region is blurred to a gradual transition from bright, white or strongly reflective to dark, black or weakly reflective in the camera image. The same correspondingly applies to sharp transitions (edges) between structure regions of different colors or color depths. In the present invention, the capturing structure (not only in the case where at least one edge is present) can reflect radiation and/or itself generate radiation (e.g. can be an array of light emitting diodes). The structure captured in the camera image thus differs from the actual appearance of the structure. The reason for this is the fact that during the time interval of structure capturing (often referred to as exposure time) by the camera, the structure has moved relative to the camera and a blurring of the image of the structure has therefore occurred. To put it another way, the blurrings arise as a result of a varying radiation distribution of the radiation captured by the camera in the course of the recording time interval. The structure can be a radiation-reflecting and/or radiation-emitting structure, for example a structure formed by a luminous image content of a display (for example comprising an LED matrix). The display can be arranged on the movable part or, in a different case, on a stationary part (base) of the machine. In the last-mentioned case, the camera is concomitantly moved with the movable part. A radiation-emitting structure can optionally have e.g. a partial structure which does not itself generate radiation in front of a radiation-emitting back partial structure. The front partial structure thus generates a radiation distribution that is not constant spatially since it permits radiation to pass in a location-dependent manner. Such a radiation-emitting structure, but also displays without a partial structure that is arranged in the direction of the camera and does not itself generate radiation are particularly well suited to the determination of the orientation of the relative movement of the first part and of the second part of the machine, said determination being described in greater detail below.

It is possible to reduce the degree of such blurrings by shortening the image recording time interval and/or illuminating the structure to be captured with very short radiation pulses. However, care must be taken to ensure sufficient illumination in order that the signal-to-noise ratio of the image information captured by the camera is not permitted to become too low. Short radiation pulses constitute an additional complexity for the illumination and in some operating situations lead to disturbances of operation or of persons situated in the region of the machine.

In a mathematical generalization, the solution is based on the following principle. Owing to physical dictates, a measuring system having infinite bandwidths cannot be realized; rather, every information-processing system has a specific finite transfer function. The latter describes how information present at the input is changed or output at the output of the system because it cannot be transmitted or processed in its full bandwidth. For optical systems there are various ways of describing the transfer function of the system. The choice of description is crucially determined by the question to be answered. For corresponding considerations that will be explained in greater detail with reference to the Figures, the mode of argumentation of the optical transfer function of an optical system is used. It can be interpreted in particular as a convolution kernel of a mathematical convolution and describes for example how contrast in the object is converted into contrast in the image. The application of the inverse optical transfer function (the mathematical convolution will also be described in greater detail as an example) thus allows the reconstruction of the object content from the image content. However, this applies only to those components of a frequency analysis (for example Fourier analysis) of the object which were transmitted by the system and/or for which an inversion of the optical transfer function is possible. To put it another way, the mapping must be bijective at least with regard to an information content sufficient for the desired purposes and/or must enable a reconstruction with sufficiently low losses.

It is proposed to evaluate the effects of the relative movement of image recording device and captured machine part, namely in particular the abovementioned blurrings of the structures in the recording image, and to determine the speed of the relative movement therefrom. Therefore, it is not necessary to shorten the exposure time as far as possible and/or to effect illumination with radiation pulses.

In particular, the following is proposed: A method for operating a motion-measuring system of a machine, in particular of a coordinate measuring machine or of a machine tool, wherein
- an image recording device arranged on a first part of the machine records at least one recording image of a second part of the machine, wherein the first part and the second part are movable relative to one another,
- a capturing structure, which is formed by the second part and/or which is arranged on the second part, is captured by the at least one recording image, and
- using information about an actual appearance of the capturing structure, a speed, an orientation, a temporal profile and/or a movement direction of the relative movement of the first part and the second part is determined from differences between the at least one recording image and the actual appearance of the capturing structure.

The method and its configurations can be in particular part of a method for operating the machine which has the motion-measuring system.

Furthermore, the following is proposed: A motion-measuring system for a machine, in particular a coordinate measuring machine or a machine tool, which has a first part and a second part, which are movable relative to one another, wherein the motion-measuring system has:
- at least one capturing structure and at least one image recording device, wherein the image recording device is arranged or arrangeable on the first part of the machine, wherein the capturing structure is formed by the second part and/or is arrangeable on the second part, and wherein the image recording device is configured to capture at least one recording image of the capturing structure, and
- a determining device configured to determine, using information about an actual appearance of the capturing structure, a speed, an orientation, a temporal profile and/or a movement direction of the relative movement of the first part and of the second part from differences between the at least one recording image and the actual appearance of the capturing structure.

Configurations of the motion-measuring system are also described. In particular, the motion-measuring system can be configured such that it implements a corresponding configuration of the method for operating the motion-measuring system. The motion-measuring system and its configurations can be in particular part of a machine which has the motion-measuring system. Therefore, the scope of the invention also includes, in particular, a machine, in particular a coordinate measuring machine or a machine tool, wherein the machine has:
- a first part and a second part which are movable relative to one another,
- a motion-measuring system having at least one capturing structure and at least one image recording device, wherein the image recording device is arranged on the first part of the machine, wherein the capturing structure is formed by the second part and/or is arranged on the second part, and wherein the image recording device is configured to capture at least one recording image of the capturing structure, and
- a determining device, configured to determine, using information about an actual appearance of the capturing structure, a speed, an orientation, a temporal profile and/or a movement direction of the relative movement of the first part and of the second part from differences between the at least one recording image and the actual appearance of the capturing structure.

Furthermore, the scope of the invention includes a method for producing a capturing structure which is usable or is used in the method according to any of the preceding claims, wherein dimensions of structure elements of the capturing structure are chosen depending on a magnitude of an expected speed of the relative movement of the first and second parts of the machine. As mentioned elsewhere in this description, the capturing structure can reflect and/or emit radiation, in particular. Therefore, producing a capturing structure also includes setting a variably adjustable capturing structure, such as a display, for example. The radiation emanating from the capturing structure and being transmitted to the at least one camera is altered by means of the setting. Alternatively or additionally, the dimensions of the capturing structure can be altered over the course of time, for example by irradiation with a radiation distribution which varies over time, for example whose wavelengths (colors) vary. By way of example, the capturing structure can have, depending on the impinging radiation distribution (for example color distribution), different dimensions of structure features of the capturing structure which can be captured by the camera. One simple possibility for altering the capturing structure consists in the use of at least one display whose represented content is altered. In particular, additional information can be obtained by means of the camera image if structure features and in particular dimensions of the capturing structure that are capturable for the camera vary during the time interval over which image information for the camera image is recorded.

Parts of the following description relate to the case where the relative movement proceeds perpendicularly to the optical axis of the imaging. However, the invention is not restricted to this case. By way of example, by means of preprocessing of the image data and/or by means of prior knowledge about the geometry of the imaging (in particular about position and/or alignment of the capturing structure relative to the camera) when determining the speed it is possible to take account of the fact that the relative movement does not proceed perpendicularly to the optical axis.

In the most frequent application of a two-dimensional recording image (also referred to as camera image without restriction to lens optics), no depth information, that is to say comprising information with respect to the third dimension, is present. By means of said preprocessing and/or prior knowledge, in particular, it is possible to take account, however, of the fact that the capturing structure can extend not just in a plane running perpendicularly to the optical axis of the imaging. By way of example, the plane of the capturing structure can run in an angular fashion counter to said plane. It is also possible for the capturing structure not just to run in a plane, but rather for example to have a three-dimensional structure and/or to run along a bent surface. Depending on the depth position of the respective point or region of the capturing structure that is imaged in the camera image, a different degree of blur can arise in the camera image.

The invention is also not restricted to the case of movements of a movable part of a machine along a rectilinear coordinate axis or within a plane. The invention is also not restricted to rectilinear movements along an arbitrary direction in space. Rather, rotational movements or superimpositions of rotational movements and rectilinear movements can also be measured by the motion-measuring system or by means of the method.

In particular, the capturing structure can have at least one and preferably a plurality of the edges mentioned above. In these cases, it is possible, in particular, to evaluate the spatial profile of the blurring (i.e. e.g. the transition from white to black or bright to dark) at the edge or edges in the camera image. In this case, e.g. knowledge of the position and/or of the profile of the edge in the capturing structure is sufficient as information about the actual appearance of the capturing structure. Optionally, it is furthermore possible to take account of how sharp the edge is in the capturing structure and to what degree and/or in what way the edge is already altered and in particular blurred on account of the recording of the camera image (e.g. as a result of imaging aberrations and spatial resolution of the camera). Alteration solely on account of the imaging can be taken into account when determining the speed, however, even if no edge is present or no blurring at an edge is evaluated.

By way of example, a capturing structure can have one or a plurality of line-like areas at whose margins are situated the edges, that is to say the abrupt transitions. In particular, a capturing structure can have line-like areas having different widths, that is to say distances between the margins and/or directions of the edge profiles. The stagger thereof can be chosen in particular depending on the exposure time interval of the camera and the speed range in which the speed of the relative movement is expected and is intended to be determined. By way of example, the capturing structure can have a continuous gray-scale value distribution and/or (in the frequency domain) a continuous frequency spectrum of the structure elements. The frequencies of the frequency spectrum are superimposed to form a common gray-scale value distribution. In this case, the frequency superimposition can be carried out with a statistical phase, thus resulting in a statistical gray-scale value distribution in the image. Such a configuration of the capturing structure is well suited to averaging out noise components in the speed measurement. However, the computational complexity for evaluating an image of a capturing structure with a statistical gray-scale value distribution is comparatively high. If, as preferred, each camera image of a sequence of successively recorded camera images (e.g. at a frequency of greater than 1 kHz) is intended to be evaluated in order to determine the speed, the computational complexity is very high. Preference is therefore given to a continuous phase relationship defined by the capturing structure—for the Fourier frequencies of the structure elements. In this case, the camera image can be referred to as a continuous data set, such that no reference or no comparison with external information is necessary.

What can be achieved with the described approach of frequency superimposition of continuous gray-scale value distributions is that every frequency occurs at every location in the capturing structure. Image generating methods with a gray shade capability for generating such continuous gray-scale value distributions are already known. Alternatively, however, e.g. a binary black-white (or bright-dark) spatial distribution can be realized by the capturing structure. For determining the speed from comparatively large distances, the point densities (pixel densities) of the capturing structure are not resolvable in this case, that is to say that they lie in a spatial frequency interval outside the transmission bandwidth of the optical system used. One example of such a gray-scale value method is the analysis of Bernoulli noise patterns, e.g. as published in "The Non-parametric Sub-pixel Local Point Spread Function Estimation Is a Well Posed Problem" by Mauricio Delbracio et al., International Journal of Computer Vision (2012) 96, pages 175-195, Springer.

The continuous gray-scale value distribution described above is merely one exemplary embodiment of capturing structures. In principle, according to Fourier's theory, any signal can be represented as a superimposition of frequencies. That is to say that binary structures (which thus form edges at the transitions of the structures) also contain many frequencies from the possible frequency spectrum. However, since an edge, i.e. an individual jump in contrast in the image, yields a non-periodic signal, a Fourier integral, i.e. not a Fourier sum, is required for its description. In this case, the frequency spectrum has an infinite extent and contains information at high frequencies which can no longer be resolved by the optical transmission system. This leads to a low signal/noise ratio. However, the binary structures in the Fourier plane can be designed such that they contain low frequencies. In particular, structure elements can be designed in a regular fashion or have appreciable periodic components. This periodicity has the consequence that the frequency spectrum contains peaks (that is to say narrow frequency ranges having abruptly rising and falling amplitudes), whose frequency spacing corresponds to the inverse structure period.

By way of example, the blurring of the edge in the camera image can be determined, characterized and/or evaluated by means of methods already known per se in the field of image processing and image enhancement. By way of example, it is possible to form the first and/or second spatial derivative of the image value (e.g. of the gray-scale value) along a line transversely with respect to the profile of the edge and in particular perpendicularly to the profile of the edge. The degree of blurring can be characterized e.g. by determining a measure of the profile of the first spatial derivative.

A further possibility consists in determining the blurring at a respective individual edge by mathematical convolution of a mathematical function describing the blurring of the edge in the camera image with a second mathematical function describing the edge of the capturing structure.

However, the direct evaluation of the blurring at an individual edge is comparatively complex and therefore costs comparatively much computation time if the evaluation, as preferred generally (not only in the case of an edge), is performed by a data processing device. Moreover, the information content obtained by evaluating an individual edge blurring is comparatively low. The accuracy of the speed determination can also be increased if not just an individual edge is evaluated. Preference is therefore given to evaluating not just an individual edge with regard to the blurring in the camera image, but rather a plurality of edges, and in particular to taking into account also the distance between the edges. In particular, it is advantageous if the capturing structure has a multiplicity of edges (i.e. at least three edges) whose distances from one another are not equal in magnitude. This concerns in particular the arrangement of the edges along a virtual or actually present (e.g. straight) line in the capturing structure which intersects the edges transversely with respect to the profile thereof and in particular perpendicularly to the profile thereof. The distance between edges is defined in particular between two closest adjacent edges, such that pairs of closest adjacent edges are situated at different distances from one another in the capturing structure. This does not preclude repetition of distances between edges, i.e. the situation in which different pairs of edges which are at an identical distance from one another are situated in different regions of the structure.

In particular, the spatial edge distribution of the capturing structure can be transformed virtually or actually e.g. by a Fourier transformation into the frequency domain and in particular the frequency distribution can be analyzed and the speed can be determined in this way. Different distances between edges thus correspond to different frequencies in the frequency domain which have larger amplitudes than other frequencies. One possibility involves evaluating the differences between the Fourier transform of a reference image, which represents the non-blurred capturing structure, and the Fourier transform of the camera image or of that region of the camera image which is assigned to the capturing structure, and determining the relative speed therefrom. By way of example, by calibrating the motion-measuring system for relative speeds of different magnitudes and respectively determining the variation of the frequency distribution relative to the Fourier transform of the reference image, it is possible to determine what effects the respective value of the speed has on the camera image and the frequency distribution. In particular, as a result of the blurring of edges, high amplitudes of the Fourier transform of the reference image are reduced and the corresponding peaks are widened. Both the amplitude reduction and the peak widening can be evaluated and the speed can be determined as a result.

Not just the capturing structures mentioned above can be configured such that properties of the capturing structures can be evaluated with regard to a plurality of in particular rectilinear evaluation directions. By way of example, it is possible to carry out the evaluation at least in two mutually perpendicular evaluation directions relative to the capturing structure. In this way, the speed component is not just determined in one evaluation direction, but in a plurality of evaluation directions. In particular, it is therefore also possible to determine the direction of the speed. To that end, the evaluation directions also need not be previously defined. Rather, from the effects of the blurring it is possible to deduce the direction of the speed by determining in the camera image the direction in which the relative movement leads to the highest degree of blurring.

If the direction in which the movable part moves is known beforehand, the direction evaluation described above is not required. This is the case e.g. for a so-called linear axis of a CMM or of a machine tool, along which part of the machine is moved rectilinearly. However, if the direction of the movement or of the speed is also intended to be determined, a capturing structure is advantageous which has structure features of identical type with respect to a multiplicity of possible evaluation directions. Structure features of identical type are not just the above-described distances between edges. Other examples will also be discussed. Preferably, the structure has structure features of identical type, in particular geometric structure features of identical type, with respect to every theoretically possible direction of the relative movement. By way of example, edges of the structure can therefore have a bent and in particular circularly bent (e.g. concentric) profile. The evaluation directions run e.g. perpendicularly to the profile of the edge(s). The determination of the direction of movement should be differentiated from the determination of the orientation of the movement, i.e. the orientation of the movement (forward or backward) along a given or possible movement path. In some of the cases described here, the orientation cannot be determined from a single camera image. One possibility for determining the orientation consists in comparison between camera images of the capturing structure which were recorded at different points in time. With one variant of the method, the orientation can already be determined by evaluation of a single camera image. This presupposes that the camera image contains image values which were obtained by evaluation (with regard to the duration and/or the beginning or end) of different time intervals. This will be discussed in even more detail.

As an alternative or in addition to at least one edge, the capturing structure can have at least one region in which the brightness, color and/or reflectivity for radiation varies continuously and thus not abruptly as in the case of an edge, but rather increases or decreases continuously. The variation is relative in particular to a straight virtual or actual line of the structure, which can be an evaluation direction. Preferably, the capturing structure has such a continuous variation not just in one straight direction, but in at least one further straight direction running transversely with respect to the first straight direction. By way of example, the brightness, color and/or reflectivity for radiation can change in a circular region along different radius lines of the circle. In particular, the movement of such a capturing structure with at least one continuous transition can be evaluated by means of mathematical convolution of the image value distribution of the camera image.

Furthermore, a capturing structure is proposed which has circular structures, in particular concentric structures, which has periodic structure elements having different periods, that is to say—in the frequency domain—having different frequencies of high amplitude. In particular, such a structure, but also other circular structures, make it possible to determine the speed with respect to different directions with respect to which the speed or components of the speed can and are intended to be determined. If one or a plurality of directions of the movement is/are defined and is/are therefore known beforehand, the capturing structure can be specifically designed and produced for said direction(s). By way of example, the edge profiles extend perpendicularly to the defined direction of movement. As a result of this restriction to one or a plurality of directions of movement, it is possible to increase the spatial resolution when determining the speed and/or the accuracy of the determination.

The evaluation of the edge blurring (as well as other configurations of the method that are described elsewhere in this description) affords the possibility of determining not only the average value of the absolute value of the speed over the exposure interval, but also, under specific preconditions, the temporal profile of the speed, e.g. the average acceleration or even the temporal profile of the acceleration over the exposure interval. The precondition is that no reversal of the movement has taken place during the exposure time. That is based on the insight that movement profiles having such a reversal and movement profiles without such a reversal can bring about blurrings that are identical at least to the greatest possible extent. The movement profile over the exposure interval can be determined e.g. from the profile of the image values and e.g. consideration of the spatial derivative or derivatives along an evaluation line transversely with respect to the profile of the edge. However, e.g. the determination and evaluation of a convolution kernel, which will be described in even greater detail, also enables the determination of the movement profile.

The imaging of the capturing structure by the camera onto the camera image can be described as mathematical convolution. In particular, it is possible to formulate an equation that equates the image value distribution of the camera image over the image area with the result of an operation in which the so-called convolution kernel is processed with the intensity value distribution of the recorded capturing structure. In this case, in particular, only that part of the image value distribution of the camera image which corresponds to the captured capturing structure is considered. In particular, a reference image of the capturing structure, which reference image was recorded e.g. by the camera with no relative movement taking place between camera and capturing structure, is suitable as intensity distribution of the capturing structure (not affected by blurring). Alternatively, however, the reference image can be obtained e.g. from planning data of the capturing structure and/or by computer simulation of the capturing structure. As will be described in even greater detail later, the convolution kernel can be determined. It contains the information about the imaging and thus alteration of the intensity distribution of the capturing structure and thus also the information about the speed of the relative movement.

The at least one camera image and the reference image—mentioned above and/or below—of the capturing structure are in particular digital images, i.e. have a plurality of pixels. Accordingly, the camera is in particular a digital camera. However, the reference image need not be present and/or processed in the same data format as the camera image. In particular, the reference image and that region of the camera image in which the capturing structure is imaged can be interpreted as mathematical functions, such that in particular a mathematical convolution of the region of the camera image with the reference image or a function derived from the reference image is implementable and is preferably actually implemented.

In the preferred case, the camera image and/or the reference image are two-dimensional images. Therefore, it is possible to use in particular a camera known per se having a two-dimensional matrix of light-sensitive sensor elements arranged in rows and columns. In this case, the pixels of the camera image are accordingly likewise arranged in rows and columns.

In particular, the information about the actual appearance of the capturing structure can comprise a reference image of the capturing structure, wherein the speed of the relative movement is determined by evaluating differences between the reference image and the at least one camera image recorded by the camera. By taking account of the reference image, it is possible to determine the speed more simply, more accurately and in a shorter time. The evaluation of the differences can be restricted in particular to a partial region of the camera image, for example to the partial region in which the capturing structure is captured. If a plurality of capturing structures are captured with the camera image, the evaluation of the differences can be restricted to the partial regions in which respectively one of the capturing structures is captured.

One preferred possibility for evaluating the differences between the camera image and the reference image and for determining the speed of the relative movement offers the abovementioned mathematical description of the convolution of the intensity distribution of the capturing structure with a convolution kernel, which yields the image value distribution corresponding to the capturing structure in the camera image. Particularly with the use of specific classes of capturing structures, the properties of which will be discussed in even greater detail, it is possible to determine the convolution kernel and thus the information about the speed of the relative movement in a simple manner from the camera image using the reference image.

In particular, by mathematical convolution of the reference image with that region of the camera image in which the capturing structure is imaged, a convolution kernel of the convolution can be determined and the speed of the relative movement can be determined from the convolution kernel.

The determination of the speed of the relative movement succeeds in a simple and clear way if the convolution kernel is interpreted as a geometric structure whose external dimensions correspond to the external dimensions of the reference image and the external dimensions of the region of the camera image in which the capturing structure is imaged. In this case, the speed of the relative movement can be determined from at least one geometric property of a partial structure of the convolution kernel. In particular, in the case of a rectilinear movement, the absolute value of the speed can be determined from a length of a partial structure of the convolution kernel. In the case of a two-dimensional camera image and reference image, absolute value and/or direction of the speed can be determined from the geometry of a partial structure of the convolution kernel. This applies in particular to the simple case in which the capturing structure moves transversely with respect to the optical axis of the imaging of the capturing structure by the camera. Such an evaluation is likewise possible in a different case, however, for example if a corresponding geometric correction is performed and/or the geometric properties of the arrangement of camera and capturing structure are taken into account.

Specific classes of patterns are particularly well suited as capturing structure. Patterns having edges have already been discussed. If the convolution kernel is determined by mathematical convolution of a mathematical function that describes the capturing structure as a function of the position (position function), in particular a corresponding operation takes place in the frequency domain. This means that properties of the capturing structure in the frequency domain are of importance. The capturing structure described as a function of the position can be transformed in particular by a Fourier transformation into the frequency domain.

Preferably, a capturing structure in the frequency domain therefore has the property of having no zero within a frequency range which begins at the frequency zero, but which does not include the frequency zero, and which ends at a predefined maximum frequency. That is to say that the function value of the function in the frequency domain, which can also be referred to as amplitude, is greater than zero within the frequency range. The maximum frequency is predefined in particular such that it is not less than the Nyquist frequency of the camera. In particular, the maximum frequency is equal to the Nyquist frequency of the camera or greater than the Nyquist frequency of the camera, but is not more than double the Nyquist frequency of the camera. A capturing structure without zeros in the frequency domain has the advantage that the convolution of the capturing structure is accomplished by means of an operation relative to the frequency domain and can therefore be carried out in a simple manner. In the case of zeros, by contrast, the operation is not defined in the frequency domain.

In one development of this class of capturing structures, with which the convolution can be carried out reliably and accurately, the function value of the position function of the capturing structure transformed into the frequency domain is greater than a predefined minimum value in the entire frequency range from zero up to the maximum frequency. In particular, the predefined minimum value is greater than a statistical fluctuation (noise) of the image values that is brought about by the recording of the camera image and by the evaluation of the camera image by an evaluation device of the machine. To put it more generally, the predefined minimum value is greater than a statistical fluctuation amplitude of image values of the recording image, said statistical fluctuation amplitude being brought about by the recording of the recording image and by a determination of the speed. The fluctuation amplitude therefore corresponds in particular to the statistical fluctuation amplitude of that capturing structure which is beset by additional noise and which, under the theoretical assumption of noise-free camera image recording and processing, leads to the same noisy evaluation result as the actual noisy recording and processing of the capturing structure. By complying with the minimum value, it is therefore possible to achieve an evaluation of the camera image which is not influenced, or not significantly influenced, by statistical fluctuations. Such a capturing structure can be generated for example using Barker codes.

Preferably, the function value of the position function of the capturing structure transformed into the frequency domain is constant in the entire frequency range from zero up to the maximum frequency. Such a capturing structure can be evaluated particularly simply and with low computational complexity.

The constant function value in the frequency range corresponds to the property that the convolution of the capturing structure with itself or its inverse function yields a delta distribution in the position space. To put it another way, a preferred class of capturing structures is therefore defined by the property that they have a perfect autocorrelation. This means that the result of the convolution of the structure with its inverse structure yields a structure in the position space which has, at a single position (in particular in a central spatial region of the structure), a different value than the values at all other positions in the central region of the structure. In particular, this one value is a high value, such that it can be referred to as a peak. The values at all other positions in the central region of the result structure are equal in magnitude, e.g. zero, or can be normalized to zero, that is to say that the value distribution is constant with the exception of the peak. As will be explained in even greater detail, with such a capturing structure, in a particularly simple manner that saves computation time, it is possible to determine the convolution kernel of the convolution which, when the convolution kernel is applied to the intensity distribution of the capturing structure, yields the corresponding image by the camera. The speed can likewise be determined from said convolution kernel in a particularly simple manner.

If e.g. positions of that part of the machine which is movable relative to the camera are determined or are intended to be determined, it is possible to use the determined speed for correction during the position determination. Apart from an improvement of the position determination result by direct evaluation of the recorded camera image, the determined speed can also be used for correcting delay effects independently of the question of whether a position determination takes place. Delays occur in particular as a result of the evaluation of the camera image and the duration of further processes of information processing, in particular during the motion control of the machine. The knowledge of the speed of the movement permits at least an estimation of how far the parts movable relative to one another have moved during a delay time period. In the consideration of a relative movement it is unimportant which part or which of the parts has/have actually moved in a stationary coordinate system of the machine. During the calibration, too, of an optical position determining system having in particular the same camera or the same cameras and in particular the same capturing structure(s), the determined speed can be used for example to correct the effects of a movement during the recording of a camera image for the purpose of calibration.

The motion measurement according to the invention has the advantage that from just a single camera image not only the position of a movable part of the machine but also the speed of the movement can be determined and in particular is actually determined. For the purpose of position determination, therefore, in particular a position determination error that arises on account of the movement can already be corrected by evaluation of the current (that is to say last determined) camera image with determination of the speed. It is not necessary to wait until the next camera image is recorded.

As already mentioned briefly, the determination of at least one kinematic variable describing the relative movement (for example the speed) can be used for open-loop control and/or closed-loop control of the movement of at least one movable part of the machine. In this case, the orientation of the movement that is determined by evaluation of at least one camera image can also be taken into account. Alternatively or additionally, the at least one kinematic variable can be used for determining coordinates of a workpiece or other measurement object by means of a coordinate measuring machine, in particular by the correction of a result of the position measurement, e.g. of the measurement of the position of a sensor carrier of a CMM. The same correspondingly applies to the determination of the position of a tool carrier of a machine tool.

The problem of determining the temporal profile and in particular also the orientation of the relative movement of the first and second parts of the machine is discussed below. Particularly in the case of the use of the above-described capturing structures having at least one edge, but also in the case of other capturing structures described in this description, just by evaluating a single recording image of the camera it is possible to determine the movement speed, but it is not readily possible also to determine the temporal movement profile and the orientation. In many cases, the movement causes the same alteration—recorded by the recording image—of the actual appearance of the capturing structure—independently of whether the movement takes place in one direction or in the opposite direction. This also makes it more difficult to determine the temporal movement profile.

The intention is to specify at least one solution which makes it possible to determine the orientation of the movement and also the temporal movement profile in particular from a single recording image.

Before the solution or solutions is/are discussed, it shall be pointed out that the determination of the orientation of the movement can also be performed without a determination of the speed of the movement. This applies to the motion-measuring system of a machine, and also a machine comprising a motion-measuring system, a method for operating a motion-measuring system of a machine and a method for operating a machine comprising a motion-measuring system.

By way of example, the determination of the orientation is advantageous even if further information about the movement is obtained in a different way than by evaluation of at least one recording image. However, this does not exclude the situation that the evaluation of at least one recording image of a capturing structure also contains additional information about the movement and this information is obtained. A case in which an evaluation of a camera image for determining the speed or position of the parts of the machine that are movable relative to one another is not absolutely necessary concerns conventional scales with scale sensors such as are customary for CMM. In particular, the scale sensors can obtain pulses from the recognition of markings (e.g. line-like markings) on the scales. Since the distances between said markings are known, information about the position and the speed of the movement can be obtained from the pulses and the temporal profile of the pulses. However, the orientation of the movement cannot be deduced solely from the temporal profile of the pulses. In this case, in particular, the orientation of the relative movement of the two machine parts can be determined from at least one recording image of the capturing structure.

The solution which makes it possible to determine the orientation of the movement and also the temporal movement profile just from a single recording image is based on a temporal variation during the transmission and/or capture of the radiation emanating from the capturing structure. Additional information about the relative movement of the machine parts is obtained as a result. The temporal variation can take place, in principle, before, during and/or after the transmission of the radiation from the capturing structure to the at least one camera and upon the capture of the radiation by the at least one camera. In order to utilize the additional information, knowledge about the temporal variation is used in the evaluation of the at least one recording image.

The ascertainment of the orientation or the knowledge about the orientation of the movement makes it possible to eliminate an ambiguity in the evaluation. As a result, it becomes possible to determine the temporal movement profile. Even if this is preferred, the invention is not restricted to determining both the orientation and the temporal profile of the movement from the respective recording image or the respective combination of recording images. By way of example, the knowledge about the orientation of the movement can be obtained in a different way and just the determination of the orientation is also advantageous, as already explained above.

In accordance with a first proposal for determining the orientation and/or the temporal profile of the movement, the radiation transmitted from the capturing structure to the camera during the exposure time interval is varied during the exposure time interval, that is to say that the spatial radiation distribution emanating from the capturing structure changes over the course of time during the exposure time interval. This therefore leads to a temporal variation during the transmission of the radiation. All sensor elements of the camera sensor matrix can have the same exposure time interval, that is to say that the exposure time interval begins at the same point in time and also ends at the same point in time for all the sensor elements. This is the case for commercially available cameras. Alternatively, the individual sensor elements of the camera, which each capture a spatial region of the radiation distribution, can have different exposure time intervals, however.

The temporally varying spatial radiation distribution acts on different sensor elements of the camera in different ways and the quantity of radiation captured by the different sensor elements during the exposure time interval (the received radiation power integrated over the exposure time interval) is therefore different even with a constant speed of movement. To put it more generally, a first of the sensor elements of the camera captures a specific spatial region of the capturing structure during the exposure time interval, on account of the temporally varying spatial radiation distribution, differently than a second sensor element of the camera, which, during the exposure time interval, captures the same spatial region of the capturing structure, but at a different partial time period of the exposure time interval. In this case, the knowledge of the spatial radiation distribution as a function of time makes it possible to determine the temporal movement profile and/or the orientation of the relative movement of the two parts of the machine.

The temporal profile of the movement can be described in various ways. For example, it can be described by the travel, the speed or by the acceleration of the movement in each case as a function of time.

From just a single recording image, it is possible to determine the temporal profile of the movement during the exposure time interval corresponding to the capture of the recording image. Optionally, from a plurality of successive recording images it is possible to determine in each case the profiles of the movement and to determine therefrom a temporal profile of the movement over a longer time period.

As will be explained in even greater detail in the description of the Figures, including with reference to mathematical equations, two ambiguities exist in the evaluation of an individual recording image. One of the ambiguities can be eliminated by the known temporal variation—described here—during the transmission and capture of the radiation emanating from the capturing structure, for example the spatial radiation distribution (see above) and/or the camera properties (see below). The other of the ambiguities consists in the orientation of the movement. During the evaluation of the recording image, in particular it is possible firstly to use the knowledge about the temporal variation and then to check which of the two possible orientations of the movement is more plausible and/or leads to a plausible result for the temporal profile of the movement.

In particular, the distribution of the image values in the recording image can be described mathematically as convolution and a convolution kernel of the convolution can be determined, wherein the convolution kernel is determined by the known temporal variation and by the temporal profile of the movement. With the exception of the orientation, the convolution kernel is determined unambiguously by these two functions of time. Taking account of the knowledge about the temporal variation and by deciding which orientation of the movement is applicable, it is possible to determine the temporal profile of the movement.

A further ambiguity arises if the speed becomes zero during the exposure time interval and in particular if the direction of the movement is reversed during the exposure time interval. That can be combatted by a correspondingly short duration of the exposure time interval. Alternatively or additionally, it is possible to increase the information content in the at least one recording image.

There are various possibilities for varying over the course of the exposure time interval the radiation distribution which emanates from the capturing structure during the exposure time interval and is/becomes capturable by the sensor matrix of the camera. A first possibility for the temporal variation of the spatial radiation distribution is the variation of the radiation intensity, i.e. of the radiant flux density. A second possibility is the variation of the spectral distribution of the radiation. Yet another possibility is the variation of the polarization of the radiation. The possibilities can be combined with one another in any desired manner. However, it is also possible, for example, for the total intensity of the radiation that emanates from each spatial region of the capturing structure to remain constant during the entire exposure time interval, but for the spectral distribution and/or the polarization to be varied over the course of time at least for partial regions of the capturing structure. By way of example, the spectral components in the green, red and blue spectral ranges can change, for example change in opposite directions, during the exposure time interval. By way of example, therefore, the radiation intensity in a first spectral range can increase, while the radiation intensity in a second spectral range decreases, and vice versa. Optionally, the radiation intensity in a third spectral range can remain constant in the meantime. This enables the spectral range that remains constant to be used as a reference, that is to say that all sensor elements which capture said spectral range over partial time intervals of the exposure time interval that are of the same length also receive the same quantity of radiation in said spectral range. A sensor element usually consists of a plurality of sub-sensor elements which are radiation-sensitive in different spectral ranges (e.g. red, green and blue). If e.g. two different sensor elements have received the same quantity of radiation during the exposure time interval in the green spectral range, but not in the blue and red spectral ranges, this allows the orientation of the movement to be deduced given knowledge of the temporal variation of the radiation distribution.

Both with regard to the variation of the intensity of the spectral components and with regard to the total intensity over the entire spectral range of the radiation, not only is it possible for the intensity to be varied in a monotonically rising manner or alternatively in a monotonically falling manner during the entire exposure time interval, but furthermore as an alternative it is possible for the intensity to pass through at least one maximum and/or at least one minimum. In particular, the intensity can be varied periodically, e.g. with a sinusoidal intensity profile over time.

Preference is given to a sinusoidal variation of the intensity of different spectral components at at least three different frequencies of the radiation, e.g. one frequency respectively in the red, blue and green spectral ranges. In contrast to the exemplary embodiment already mentioned above, a variation of the intensity in the green spectral range also takes place in this case. In practice, e.g. red, green and blue light emitting diodes can be used to generate the radiation emanating from the capturing structure with an intensity that varies over the course of time. Light emitting diodes, not just in this combination of three colors, can be driven in a simple manner in order to generate the desired temporal profile of the intensity.

The at least three spectral components having a sinusoidal temporal profile of the intensity lie in particular in a narrow spectral range. A plurality or all of the temporal profiles of the intensity can have the same frequency of the intensity change. In this case, the spectral components are not restricted to the visible spectral range. Rather, in particular, radiation components in the infrared range and, with observance of the occupational health and safety regulations, also in the ultraviolet range are also suitable.

The at least three sinusoidal profiles of the radiation intensity in the at least three frequency ranges considered pairwise in each case have a phase shift, that is to say that the maximum of the intensity is attained at different points in time. Even if this is preferred, the frequency of the intensity change over the course of time does not have to be identical for all of the at least three sinusoidal profiles. For exactly three sinusoidal profiles it is preferred for the frequency of the intensity change to be identical and for the phase shift between each pair of sinusoidal profiles to amount to one third of the period.

The use of at least three sinusoidal intensity profiles in different spectral ranges has the advantage that the orientation of the relative movement of the two machine parts is determinable unambiguously at any rate in all cases in which no reversal of the movement occurs during the exposure time interval.

As an alternative to a sinusoidal intensity profile, the intensity can be varied in the manner of a repeated random abrupt variation (hereinafter: pseudo-random) over the course of time.

In a pseudo-random variation, the different intensity levels of the radiation occur in a distributed manner similarly to a random distribution, but the variation is predefined and known. It would be conceivable for the variation of the intensity actually to be performed randomly. However, this increases the complexity for ascertaining the actually occurring variation of the intensity and taking it into account in the evaluation. Moreover, in the case of an actually random variation, there is a certain probability of variations arising which contain little information for the determination of the orientation.

The pseudo-random variation of the intensity can be compared with a code that corresponds to the temporal sequence of intensity levels. Unlike in the case of an actually random variation of the intensity levels, it is possible to stipulate that each intensity jump from one level to a following level or at least one of a plurality of successive intensity jumps must have a minimum jump height (downward or upward).

Independently of the type of variation of the intensity, it is preferred for the quantity of radiation that maximally impinges on any sensor element of the camera sensor matrix during the exposure time interval to be coordinated with a saturation quantity of the sensor elements. Saturation is understood to mean that, once a saturation quantity of radiation has been reached, the sensor signal no longer or no longer suitably reproduces the received quantity of radiation over and above the saturation quantity.

Compliance with the saturation quantity makes it possible, in particular at the beginning or at the end of the exposure time interval, during a short partial time period, to radiate (to emit and/or to reflect) a high proportion of the saturation quantity from the capturing structure in relation to the length of the partial time period. By way of example, during the first percent of the integration time period, it is possible to radiate a quantity of radiation in the range of 10% to 20% of the saturation quantity, e.g. 15% of the saturation quantity. In the further course of the exposure time interval, therefore, a correspondingly rapid fall in the intensity takes place, such that the saturation quantity cannot be reached or cannot be exceeded. Sensor elements which have received a specific quantity of radiation during the exposure time interval must therefore have captured at the beginning of the exposure time interval that region of the capturing structure from which the initially high quantity of radiation was radiated. Just this information provides unambiguous indications of the orientation of the movement. Not only with regard to the exemplary embodiment described in this paragraph this illustrates that, at any rate in the case of a movement which is not reversed during the exposure time interval, the orientation of the movement can be determined unambiguously in a simple manner.

An example of a greatly varying intensity was described above, i.e. the first temporal derivative of the intensity of the radiation is high. As mentioned, this has the effect that a comparatively small proportion of the sensor elements receives a large quantity of radiation during the exposure time interval and the orientation of the movement and also the temporal profile of the movement can therefore be deduced in a simple manner. This is not restricted to the situation where the quantity of radiation emanating from the capturing structure is particularly high in a specific partial time period (e.g. at the beginning or end) of the exposure time interval. As long as the information about the partial time period in which the quantity of radiation is particularly high is taken into account in the evaluation of the recording image, the orientation and also the temporal profile of the movement can be determined in a simple manner. However, in one preferred embodiment, consideration should be given to ensuring that the change in the radiation intensity does not have at any rate in all spectral ranges a profile that is temporally symmetrical with respect to the midpoint of the exposure time interval. Without further measures that can also be implemented, the orientation cannot be unambiguously determined in the case of such a symmetrical variation of the radiation intensity.

It has already been mentioned above that the radiation intensity can be varied periodically. In one development of this approach with a multiplicity of temporally successive intensity maxima and intensity minima during each exposure time interval, the frequency of the intensity maxima or intensity minima is varied. However, the frequency coordinated with the expected speed of movement is not so high that the radiation intensity affects all sensor elements along the movement direction of the movement equally. Rather, it is preferred that the frequency has a maximum value which is not exceeded and allows differentiation of the effects regarding the reception of quantities of radiation on the different sensor elements, which can be attributed to the variation of the frequency, and allows conclusions to be drawn therefrom about the orientation and/or the temporal profile of the movement.

A further possibility for determining the orientation and/or the temporal profile of the movement by temporal variation consists in a temporal variation at the receiving end of the radiation, i.e. the camera. Individual exemplary embodiments have already been indicated. In this regard, it is possible, for example, for the exposure time intervals of all sensor elements of the sensor matrix of the camera not to begin at the same point in time and end at the same point in time. This is achieved, in particular, by the values of the integrated quantities of radiation of the individual sensor elements being read out successively and being set to zero again with the read-out. In this case, it is optionally possible to perform the read-out of the quantities of radiation simultaneously for a plurality of the sensor elements, such that the sensor elements are assigned to a plurality of read-out sequences. The sensor elements assigned to the read-out sequences are read successively in accordance with the read-out sequences. Alternatively, it is possible for there to be a plurality of read-out sequences of adjacent sensor elements in the sensor matrix, but only ever one sensor element of the entire sensor matrix is read at any point in time. In the case of two read-out sequences, for example, one of the sensor elements of the two read-out sequences can therefore always be read alternately.

In any case the knowledge about the different exposure time intervals of the individual sensor elements is taken into account in the evaluation and the determination of the orientation and/or the temporal profile of the movement. Therefore, in contrast to customary practice, a complete recording image of the camera containing values from all the sensor elements is not a snapshot limited to a single exposure time interval, but rather contains information about a longer temporal profile of the capture of the capturing structure. If e.g. a sensor element past which a specific part of the capturing structure has moved has not captured said part of the capturing structure, or has captured it with a smaller quantity of radiation, in contrast to its neighboring sensor elements, information about the orientation and/or the temporal profile of the movement can be obtained therefrom. To put it generally, taking account of the knowledge about the exposure time intervals of the individual sensor elements, it is possible to determine in a simple manner whether the movement with one orientation or with the opposite orientation corresponds to the recording image of the camera, and/or it is possible to determine the temporal profile.

As an alternative or in addition to the use of different exposure time intervals, other properties of the camera can be varied temporally. This concerns in particular the influencing of the radiation transmissivity of the radiation optics of the camera, e.g. using stops and/or filters having temporally varying properties (e.g. by movement or control of the stop and/or of the filter), and also the sensitivity of the sensor elements to the impinging radiation. With lower sensitivity, the same received quantity of radiation leads to a smaller value of the sensor signal of the sensor element, and vice versa. If e.g. the sensitivity is reduced from a high value at the beginning of the exposure time interval firstly in a rapidly falling manner and then, in the further course of the exposure time interval, in a more slowly falling manner to a low value of the sensitivity, then this corresponds to the above-described exemplary embodiment with high radiation intensity at the beginning and low radiation intensity at the end of the exposure time interval.

The temporal variation of properties of the camera, including the use of different exposure time intervals of the individual sensor elements, can be compared with the above-described temporal variation of the spatial intensity distribution of radiation emanating from the capturing structure and leads partly to mutually corresponding procedures in the determination of the orientation and/or the temporal profile of the movement. All the above-mentioned procedures of temporal variation make it possible, in particular individually or in combination with one another, to determine the orientation and/or the temporal profile of the movement from a single recording image.

Furthermore, it is possible to use not just one camera, but a plurality of cameras, e.g. cameras having sensor elements which are sensitive in the comparison of the cameras in different spectral ranges. It is also possible to use a camera, either as a single camera or in combination with other cameras, wherein the sensor matrix of the camera has sensor elements whose spectral sensitivity differs from the spectral sensitivity of other sensor elements. By way of example, the various measures of temporal variation can be combined with one another by virtue of the intensity level of the radiation emanating from the capturing structure being varied pseudo-randomly, while at least one property of at least one camera which generates a recording image of the capturing structure is varied in a different way than the intensity level.

A further possibility for varying the spatial radiation distribution over the course of time during the exposure time interval consists in changing the polarization of the radiation transmitted from the capturing structure to the camera over the course of time. By way of example, the capturing structure can have a light source and/or a display, wherein a controllable polarization filter of the capturing structure is arranged in the direction of the camera and allows the polarization of the radiation emanating from it in the direction of the camera to be controlled spatially differently and time-dependently.

The camera or at least one of the cameras can have sensor elements which are selectively sensitive to radiation having a specific direction of polarization. Analogously to the way in which, in customary sensor matrices, the individual sensor element has a plurality of sub-sensor elements which are sensitive for different spectral ranges, the sensor elements can have in each case a plurality of (in each case at least two) sub-sensor elements which are sensitive to radiation having different directions of polarization. In this way in an analogous manner to that above for the different temporal variation of the intensities in different spectral ranges of the radiation incident on the camera, it is possible to vary the direction of polarization and to obtain the same information with regard to the movement identification and in particular with regard to the determination of the orientation and/or the temporal profile of the movement.

The description of the Figures will discuss in even greater detail the fact that the capturing structure can have at least one marker. The description of the Figures concentrates on concrete exemplary embodiments. However, it is generally possible for the capturing structure to comprise at least one marker or to consist of at least one marker. In particular, a marker can be understood to be a surface having a self-contained outer circumferential line (i.e. outer edge, e.g. circle or rectangle line), the radiation properties (emittance and/or reflectance) changing abruptly at the circumferential line. In particular, the radiation properties of the surface bounded by the circumferential line can be constant. The circumferential line of the marker thus constitutes an edge within the meaning of the description above.

In particular, the capturing structure can comprise at least one circular marker. This has the advantage that the relative movement of the capturing structure and the camera in any direction along the marker surface has the effect that the circle line at the outer circumference of the marker is crossed perpendicularly, i.e. in the direction of a radius of the circle line, by a projection of the movement path of the relative movement onto the marker surface. In each of these cases, therefore, there are adjacent sensor elements of the camera sensor matrix which, during the progression of the relative movement, are exposed to an abrupt rise or fall in the received radiation intensity, as was described above with regard to edges. Particularly if only specific directions of movement can occur, the use of markers shaped differently than circular markers is also advantageous.

One development of the movement identification and in particular of the determination of the orientation and/or the temporal profile of the movement is described below. This development addresses the problem that different spatial intensity distributions and/or different temporal variations of the spatial intensity distribution and/or of the camera properties lead to results having different degrees of success. This also depends on the type of relative movement of the first and second machine parts. In particular, the movement can be faster or slower and have a larger or smaller dynamic range, that is to say that the acceleration and/or the jerk of the movement can have different magnitudes.

In order to solve this problem, it is proposed that a temporal sequence of recording images be recorded by the camera, by a plurality of cameras or in each case by one of a plurality of cameras and be evaluated. In this case, at least one first recording image of the temporal sequence is evaluated and the temporal variation of the spatial radiation distribution and/or the temporal variation of the camera properties are/is altered depending on the result of the evaluation of at least one first recording image. Accordingly, a second recording image, recorded after the evaluation of the at least one first recording image, will capture radiation in an exposure time interval in which the temporal variation of the spatial radiation distribution and/or the temporal variation of the camera properties has already been altered relative to the exposure time interval of the first recording image.

In this way, it is possible to adapt the temporal variation to the relative movement. In particular, a setting of the temporal variation of the spatial radiation distribution at a recording frequency of recording images in the range of up to more than 1 kHz or even more than 1 MHz is possible with present-day means for the control of radiation sources, e.g. displays and/or arrangements of light emitting diodes. While the radiation emanating from displays can be varied, e.g. in the range of a few 100 Hz, for example in the range of 200-600 Hz, the radiation emanating from light emitting diodes can also be varied at significantly higher frequencies right into the MHz range. On account of the computing power of computers available nowadays, it is also possible to evaluate individual recording images and to control altered temporal variation of the spatial radiation distribution at these frequencies. The same correspondingly also applies to the temporal variation of the camera properties. By way of example, the order when reading out the integration values of the sensor elements can be changed in a simple manner, even if this may have the effect that during a time period between the recording of the first recording image of the sequence and the second recording image of the sequence a meaningful recording image cannot be obtained while the order of read-out is changed over.

Alternatively or additionally, after the evaluation of the at least one first recording image and before the recording of the second recording image, the duration of the exposure time interval can be altered, e.g. if it is ascertained during the evaluation of the at least one first recording image that the saturation value has been reached, exceeded or approximately reached in the case of at least one of the sensor elements, or if it is ascertained that the saturation value has not been approximately reached in the case of all the sensor elements, e.g. with only 10% or 20% of the saturation value having been reached. As an alternative or in addition to the alteration of the duration of the exposure time interval, the intensity of the radiation can be adapted. To put it generally, preference is given to stipulating in what range of the quantity of radiation between zero and the saturation value the quantity of radiation of the sensor elements is intended to be during the recording of recording images and/or what conditions the distribution of the values of the quantities of radiation that are yielded by the sensor elements is intended to comply with. If the stipulation is not fulfilled, for example the stipulated range e.g. for a stipulated number or a stipulated percentage of the sensor elements is not complied with, the radiation intensity and/or the duration of the exposure time interval are/is altered until the criterion is fulfilled for a following recording image.

Returning to the temporal variation of the spatial radiation distribution, two exemplary embodiments will now be described. In accordance with the first exemplary embodiment, the intensity of the radiation in at least one spatial range of the radiation distribution (e.g. at least one spatial range assigned to a marker) is varied sinusoidally over time in different spectral ranges of the radiation, that is to say that the intensity is a sinusoidal function of time. In this case, the sinusoidal profiles of the intensity can be phase-shifted in at least two, preferably at least three, different spectral ranges.

If it is ascertained in the evaluation of the first recording image of the sequence that the result of the evaluation with regard to the determination of the orientation and/or the temporal profile of the movement is not satisfactory (because e.g. it is not possible to ascertain unambiguously what orientation the movement has), then the amplitude of at least one sinusoidal profile, the frequency of at least one sinusoidal profile and/or the phase shift between at least two sinusoidal profiles of the different spectral ranges are/is altered. In at least one further recording image recorded in the case of altered sinusoidal profiles, it is then ascertained whether the result of the evaluation is satisfactory or whether an alteration of the temporal variation of the radiation distribution is performed. Optionally, the sinusoidal profiles are altered again after the evaluation of one or a plurality of the further recording images until a satisfactory evaluation result is obtained. The sinusoidal profiles are typically set to a higher sinusoidal frequency if the dynamic range of the movement is greater, and vice versa. The amplitude of the sinusoidal profiles is preferably set such that the signal/noise ratio with respect to the evaluation of the different spectral components is high, wherein attention should also be given to ensuring that the quantities of radiation determined by the sensor elements of the camera sensor array in the exposure time interval are distributed over a significant partial range between zero and the saturation quantity.

In accordance with a second exemplary embodiment, relating to the above-described pseudo-random variation of the intensity level, the type of pseudo-random variation is changed if it is ascertained that there is a need to do this after the evaluation of the first recording image. The type of pseudo-random variation of the intensity level of the radiation is determined in particular by the length of the time intervals during which the intensity is constant, by the difference between the maximum allowed and the minimum allowed intensity and/or by the maximum allowed intensity, that is to say that one or more of these parameters are changed if the type of pseudo-random variation of the intensity level of the radiation is altered. In particular, the length of the time intervals of constant intensity can be chosen to be shorter if the dynamic range of the movement is high, and vice versa. The difference between the maximum allowed intensity and the minimum allowed intensity can be chosen in a manner analogous to that in the first exemplary embodiment for the amplitudes of the sinusoidal profile. The same correspondingly applies to the maximum value of the intensity.

Fast image processing algorithms which enable a decision about whether the temporal variation of the radiation intensity and/or of the camera properties ought to be altered utilize a Fast Fourier Transformation (FFT), for example. Methods which evaluate quantities of radiation in different spectral ranges can also be configured as fast in this sense. Moreover, also during evaluation of a recording image with respect to radiation in a single spectral range, for example, a frequency shift on account of the relative movement of the machine parts can be ascertained in a fast manner. In this case, the radiation intensity can be changed over time in particular periodically (for example in a cosinusoidal fashion). Given constant speed of the relative movement, the frequency of the periodic change in the recording image corresponds without alteration to the spatially periodic profile of the image values. By contrast, a non-constant speed leads to a frequency shift in the spatially periodic profile of the image values and the temporal speed profile can therefore be determined from the recording image. The frequency shift can be ascertained for example by way of a spatially resolved frequency analysis at a multiplicity of positions of a recording image. In this case, it is also possible to ascertain the spatial distribution of the frequency shift and thus to obtain information about the temporal profile of the relative movement.

Furthermore, information from the history of the movement, in particular from the past evaluation of a sequence of camera images, can be used to set the temporal variation of the transmission and/or capture of the radiation. Kalman filters, in particular, are suitable for this purpose.

The variation of the intensity in different spectral ranges and the alternatively or additionally performed variation of the polarization of the radiation are perceived as less disturbing than the variation of the total radiation intensity by persons situated in the region of the machine.

In particular, it is possible to use at least one camera having sensor elements which are sensitive in each case in one of more than three or four spectral ranges. In particular, so-called hyperspectral cameras are known, which comprise sensor elements that are sensitive in more than ten, for example sixteen, different spectral ranges. The information content in the recording image can be increased even further in this way.

Particularly in the case of such cameras, but also in the case of cameras having sensor elements that are sensitive in fewer spectral ranges, the radiation intensity of the radiation emanating from the capturing structure can be varied in the different spectral ranges with different frequencies of the intensity change. By way of example, the radiation intensity can be varied with a frequency of 5 kHz in a first spectral range and the radiation intensity can be varied with a frequency of 10 kHz in another, second spectral range. Different frequencies increase the information content and simplify the evaluation of the recording images.

In particular, the movement range of the two parts of the machine which are movable relative to one another can be small. It is therefore possible for the spatial capture region of the at least one camera to be designed likewise to be small, without the capturing structure being able to leave the capture region. In this case, in particular, the below-described method of radiating a pattern onto the surface of the capturing structure is advantageous since both the relatively small spatial capture region and the evaluation of the result of radiating the pattern require little outlay or enable an evaluation of the recording images with particularly high accuracy.

One possibility for the temporal variation consists in radiating (in particular projecting) an adjustable spatial radiation distribution onto the capturing structure. The appearance of the capturing structure that is already present without the projection, together with the radiated radiation distribution, determines the effective appearance that is captured by the at least one camera.

In particular, the appearance that is already present without projection can form a first pattern (that is to say a structure) and the radiated spatial radiation distribution on the surface of the capturing structure can generate a second pattern. Appropriate patterns are in particular binary patterns, for example chequered patterns, patterns having parallel stripes, patterns having concentric rings and/or patterns having specific properties such as the MURA, additionally explained with reference to FIG. 8. In particular, the first pattern and the second pattern can be of identical type, such that the superimposition of the first pattern with the second pattern can result, in particular, in the same appearance as the first pattern alone and/or in an extinction of the pattern (i.e. a homogenous appearance) at least in spatial partial regions of the surface of the capturing structure. This makes it possible, in the evaluation of at least one recording image, in particular, to determine a simple variable containing information about the relative movement. By way of example, the degree to which the first binary pattern is extinguished by the second binary pattern can be determined in a simple manner by the area proportion which does not correspond to the binary value of the extinction (for example "1" for "bright"). Alternatively or additionally, a Moiré effect that arises as a result of the superimposition of the two patterns and/or some other pattern-specific superimposition effect can be determined and evaluated in a simple manner.

In one development, a predefined state of the superimposition of the first and second patterns can be present and, by radiating the second pattern onto the capturing structure, an attempt can be made to attain or come as close as possible to said predefined state despite the relative movement of the machine parts. In order to achieve this, for example, as already described above, at least one first recording image is evaluated and the radiating of the second pattern is adapted depending on the result of the evaluation. It is thereby possible, in particular, for the range of values for the variable to be evaluated to be kept small. This in turn allows the variable that is to be evaluated to be determined with little complexity and with a good signal/noise ratio.

BRIEF DESCRIPTION OF THE DRAWINGS

Exemplary embodiments of the invention will now be described with reference to the accompanying drawing. In the individual Figures of the drawing.

DETAILED DESCRIPTION OF THE PREFERRED EMBODIMENTS

Figure 1:
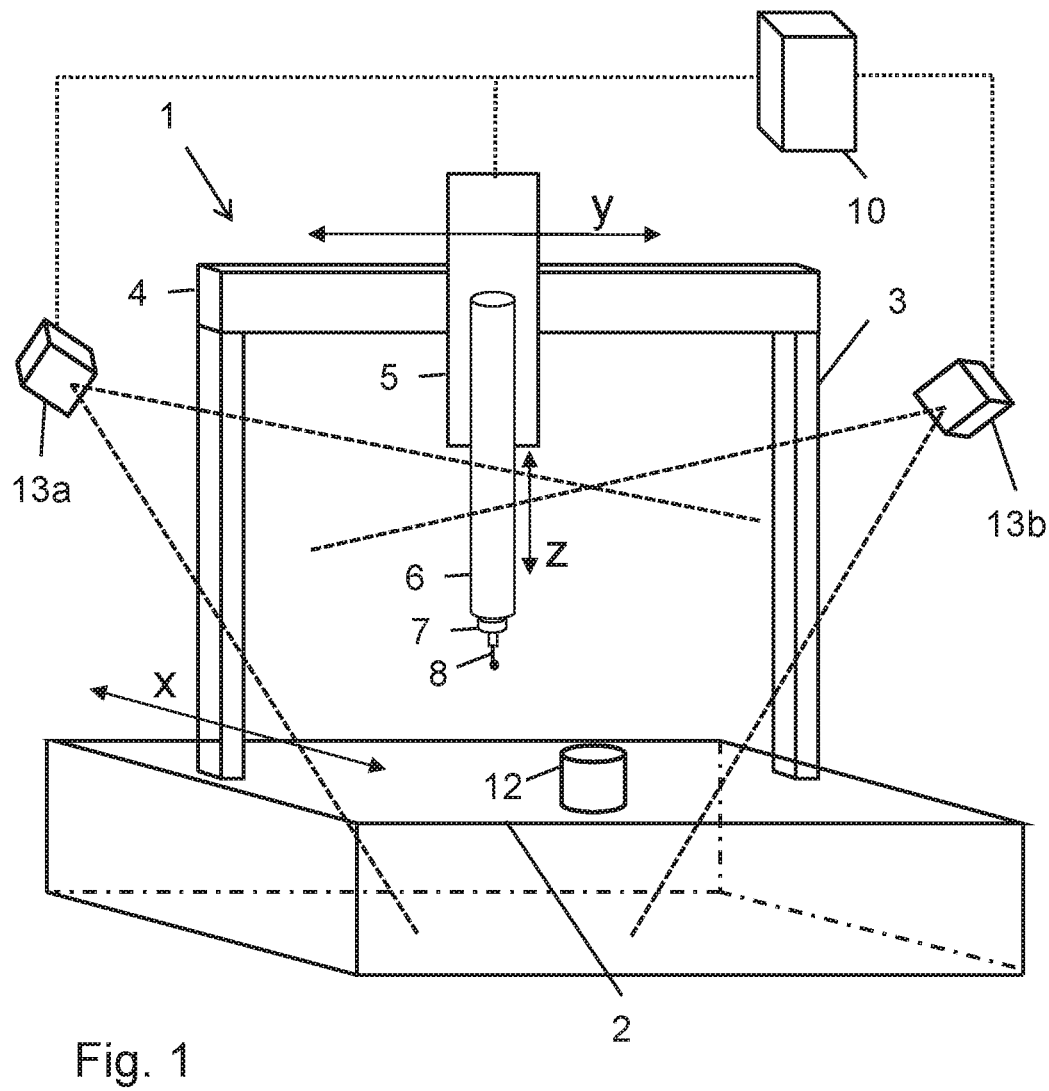
FIG. 1 shows, in a simplified schematic illustration, a coordinate measuring machine of gantry design, wherein a plurality of cameras are aligned with the movement region of the sensor carrier at the lower end of the sleeve of the CMM.

FIG. 1 shows a coordinate measuring machine 1 of gantry design. The gantry 3, which is movable in the X-direction of a cartesian coordinate system of the CMM 1, is arranged on a measuring table 2 of the CMM 1. A slide 5 can be moved in the Y-direction of the coordinate system along a transverse carrier 4 of the gantry 3. Furthermore, a sleeve 6 is arranged on the slide 5 movably in the Z-direction of the coordinate system. A measuring head 7, i.e. a sensor, carrying a probe 8, is secured on the lower end of the sleeve 6. No drives are illustrated in the simplified illustration.

As is illustrated schematically in FIG. 1, the coordinate measuring machine 1 comprises a control and evaluation device 10, which is for example part of a commercially available computer or computer specifically configured for the operation of the CMM, said computer being equipped with software for the operation of the CMM 1. The control and evaluation device 10 is connected to the movable parts of the CMM 1, as is illustrated by a dotted line. A workpiece 12 is situated on the measuring table within the movement range of the probe 8.

In conventional CMMs, and also in machine tools, measuring transducers and material measures are fitted on the parts that are movable relative to one another, in order to determine the position of the sensor carrier (here of the sleeve 6). From the positions at different points in time it is also possible to determine the speed and optionally also the acceleration. In the illustrated example of a CMM, however, the lower end of the sleeve is captured by a plurality of cameras connected to the base of the CMM 1 via connections (not illustrated). The base includes the measuring table 2, in particular. From just a single one of the camera images, which are preferably recorded repeatedly in succession, the speed, the temporal profile and/or the orientation of the movement of the lower end of the sleeve and optionally also the position thereof are determined. In particular, in each case the current camera image recorded last can be evaluated in this way.

In the exemplary embodiment illustrated specifically in FIG. 1, only two cameras 13a, 13b are illustrated, which in each case completely capture the movement range of the lower end of the sleeve, but in this case they view in different viewing directions. The cameras 13 are e.g. wide-angle cameras. They are likewise connected to the control and evaluation device 10, as is illustrated by dotted lines.

As an alternative to the arrangement on a part of the machine that is not moved in the laboratory coordinate system, e.g. the base, the at least one camera can be arranged on the part that is movable in the laboratory coordinate system, e.g. the sleeve. In this case, the at least one capturing structure is arranged on the part that is not moved in the laboratory coordinate system. Furthermore, it is possible for both the at least one camera and the at least one capturing structure to be arranged in each case on different parts that are movable in the laboratory coordinate system. If the at least one camera is arranged on a movable part of the machine, the capturing structure can be stationary in the laboratory coordinate system. Alternatively, the capturing structure can likewise be moved even if the at least one camera is aligned with a non-movable part of the machine. To that end, the non-movable part of the machine comprises for example at least one display on which the capturing structure is represented. Taking account of the information about where the capturing structure is situated at a given point in time and/or with what movement it moves, it is then possible to determine the relative movement and/or relative position. A capturing structure that is moved just like the camera, in particular a capturing structure that is moved at approximately the speed of the camera, makes it possible to use a camera having a normal aperture angle of the captured spatial region or even having a narrow aperture angle. As a result, the resolution by the camera image is refined and/or a digital camera having fewer pixels can be used.

Figure 2:
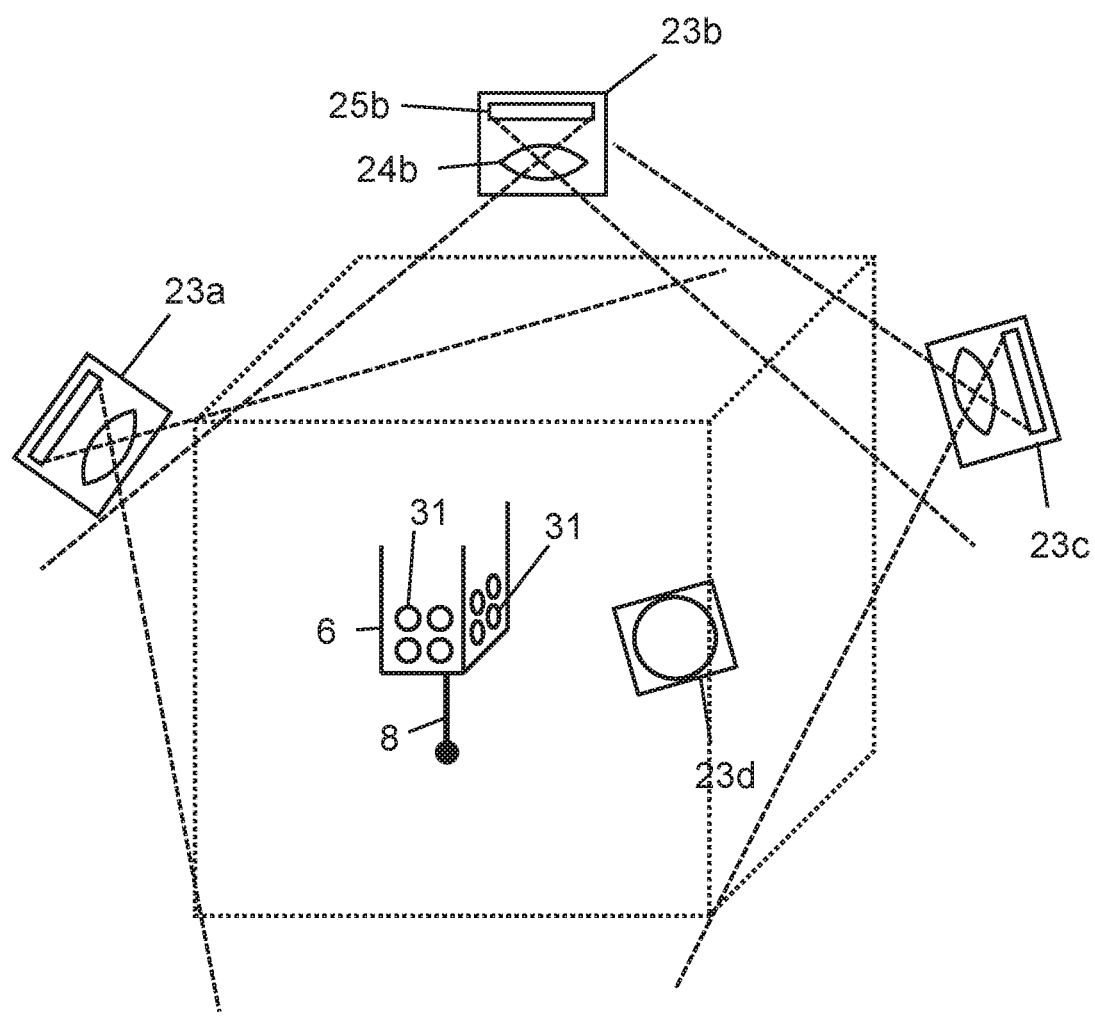
FIG. 2 shows a schematic illustration with four cameras whose capture regions cover the movement region of a sensor carrier of a CMM, wherein a plurality of capturing structures are arranged on the sensor carrier, FIG. 3 schematically shows, in a simplified illustration, a coordinate measuring machine of gantry design having cameras secured on the sensor carrier, and a multiplicity of capturing structures connected to the base of the CMM.

FIG. 2 shows a movement range of a movable part of a CMM, said movement range being represented by a cube having dotted edge lines. The lower end region of a sleeve 6 of a CMM with a probe pin 8 coupled thereto as a movable part is illustrated as an example in the Figure. However, the movable part could also be some other part of a CMM or of a machine tool, e.g. a measuring head of a CMM or a tool or tool carrier of a machine tool. The camera arrangement in FIG. 2 can be used for example as an alternative to the arrangement in FIG. 1 or 4.

A total of four cameras 23a, 23b, 23c, 23d are in each case aligned with the movement range in a different direction. Margins of the capture range of three of the cameras 23a, 23b, 23c are represented by dashed lines as in FIG. 1. On the basis of the example of the camera 23b illustrated at the top in FIG. 2, the illustration furthermore shows schematically that the cameras in each case comprise an optical unit 24b, e.g. a lens arrangement, and a sensor element matrix 25b composed of radiation-sensitive sensor elements.

The movable part 6 has in each case at least one marker 31 on different sides, here on differently oriented surfaces. In this case, the marker or groups of markers forms/form a capturing structure that is captured by at least one of the cameras 23. In the example, in each case four markers 31 are arranged on the front-facing surface and on the surface facing toward the right. The four markers 31 are in each case captured at least by one of the cameras 23. By way of example, the markers 31 of that surface of the movable part 6 which faces toward the right are captured by the cameras 23c, 23d on the right and in the foreground of FIG. 2. The camera 23d illustrated in the foreground can e.g. additionally capture the forward-facing surface, which is also captured by the camera 23a illustrated at the top left.

Figure 4:
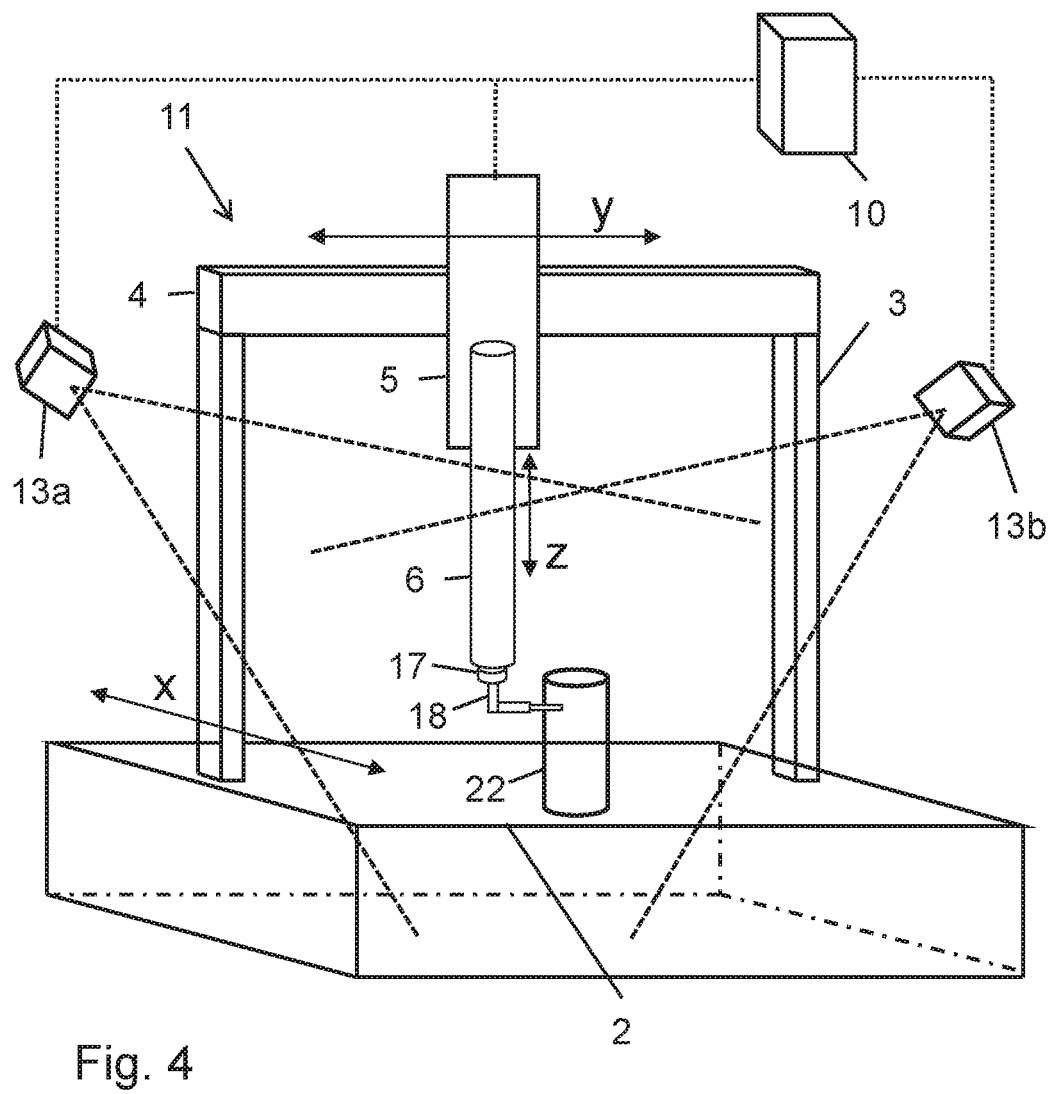
FIG. 4 shows a machine tool of gantry design, in an illustration similar to FIG. 1, but with a processing tool being carried instead of a measuring sensor at the lower end of the sleeve.

The arrangements of cameras secured on the base of a CMM or a machine tool, as illustrated schematically in FIG. 1 and FIG. 2, are merely examples. This also applies to the design of a CMM illustrated in FIG. 1. FIG. 4 illustrates a machine tool 11 as a variant, the design of said machine tool being the same as the design of the CMM 1 from FIG. 1 with a few exceptions. The difference between the machine tool 11 in FIG. 4 and the CMM 1 in FIG. 1 will be described briefly below. Identical reference signs designate identical parts, which will not be described again. The machine tool 11 in FIG. 4 comprises a tool carrier 17 at the lower end of the sleeve 6, said tool carrier carrying a processing tool 18 for processing a workpiece 22 on the table.

In the case of the arrangements with cameras 13; 23 secured on the base as illustrated in FIGS. 1, 2 and 4, the speed, the temporal profile and/or the orientation of the movement and optionally also the position and/or alignment of the movable part are ascertained for example as follows. The cameras 13; 23 record images of their capture range repeatedly, e.g. at a clock frequency of 100 Hz. Each image acquires a time stamp, that is to say that the point in time of the recording of the respective camera image is assigned to the camera image and stored e.g. in a common data set with the image data.

The speed, the temporal profile and/or the orientation of the movement and optionally also the position and/or alignment of the movable part within its movement range are ascertained in particular from camera images of a plurality of the cameras 13; 23 that are recorded at the same point in time. Each individual camera image to be evaluated is optionally subjected to a preprocessing in which that image region of the camera image in which at least one capturing structure of the movable part (e.g. a characteristic feature or a marker) is situated is determined. In this case, only the image data of the determined region of the camera image are evaluated further for the purpose of ascertaining the speed, the temporal profile and/or the orientation of the movement and optionally also the position and/or alignment of the movable part. Said preprocessing takes place, e.g. within the respective camera that recorded the camera image, and is carried out e.g. by a computing device of the camera. The next processing step, namely the determination of the speed, the temporal profile and/or the orientation of the movement and optionally also the position and/or alignment of the at least one capturing structure captured in the camera image, in relation to a coordinate system of the camera (which can be in particular a two-dimensional coordinate system lying in the image plane of the camera image), can also be performed in a decentralized manner, e.g. by the abovementioned computing device of the camera. Alternatively, it is also possible, however, to enable the camera images recorded at the same point in time and/or the camera images of a plurality of cameras not recorded at the same point in time, which, however, have captured the same or approximately the same position and/or alignment of the movable part, to be evaluated jointly by a central evaluation device. This is expedient particularly if camera images of different cameras capture the same capturing structure or the same capturing structures. The computing device can be for example one or a plurality of microprocessors and/or FPGA (Field Programmable Gate Array).

In particular, the knowledge of the geometric properties of the capturing structure is utilized when ascertaining the speed, the temporal profile and/or the orientation of the movement and optionally also the position and/or alignment of the movable part from the camera image or camera images. By way of example, the capturing structure can be a capturing structure having a circular or rectangular outer edge, wherein the area of the capturing structure is not optically homogenous within its boundary, that is to say that the capturing structure has an optical structure over the profile of its area. Therefore, from the image of the structured area it is possible to deduce the speed, the temporal profile and/or the orientation of the movement and optionally also the position and/or alignment of the capturing structure and thus of the movable part connected thereto.

The knowledge about the at least one captured capturing structure makes it possible to ascertain, on the basis of geometric considerations from the at least one camera image, how the capturing structure is positioned and/or aligned in the movement range of the movable part. By way of example, a capturing structure having a circularly circumferential margin is imaged in the camera image in general as a structure having a circumferential margin of an ellipse. E.g. by ascertaining the position and length of the major axes of the ellipse in the camera image, it is possible to ascertain the viewing angle of the camera with respect to the capturing structure and the distance between the camera and the capturing structure. Preferably, the at least one capturing structure captured in the camera image or the camera images contains redundant information, such that the position and/or alignment of the capturing structure can be implemented not just on the basis of one structure feature, but on the basis of a plurality of structure features. The certainty in the determination of the position and/or alignment of the movable part is increased as a result. This also applies with regard to the evaluation of a plurality of camera images which have captured at least one capturing structure from different viewing directions in the same movement state of the movable part.

However, ascertaining the imaging geometry of camera and movable part, e.g. with calculation of the viewing angle and the distance from the geometry of the imaged capturing structure, does not constitute the only possible procedure. Other methods are known from image processing. By way of example, by comparing the capturing structure imaged in the camera image with simulated and/or previously recorded images, it is possible to determine the position and/or alignment of the capturing structure in the movement range. By way of example, the corresponding position and/or alignment can be assigned to each of the simulated or previously recorded images. The position and/or alignment are/is therefore ascertained by determining the correct comparison image.

Figure 3:
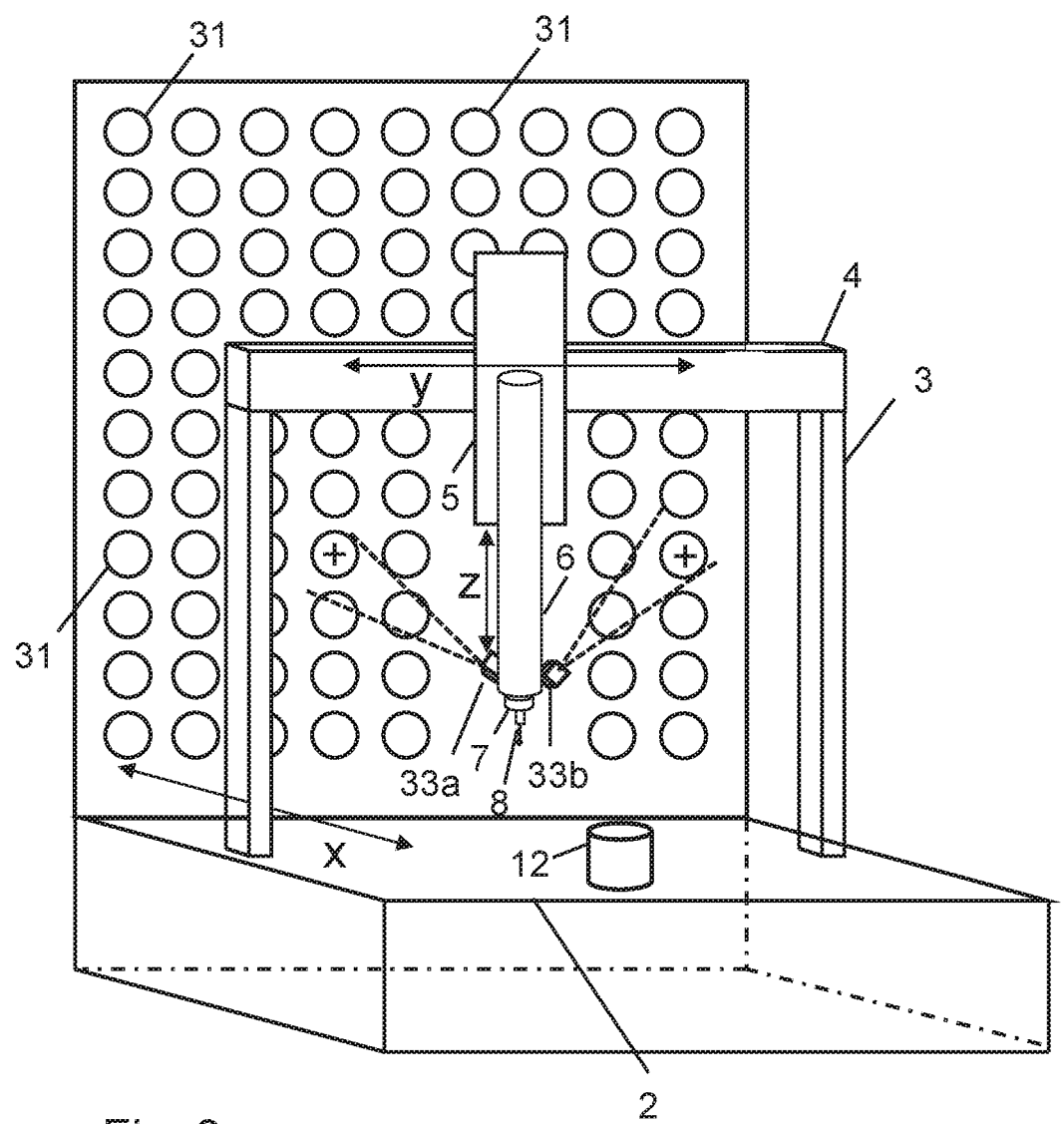

FIG. 3 shows one exemplary embodiment of the reversal of the principle explained with reference to FIGS. 1, 2 and 4, according to which the at least one camera is connected to the base and the at least one capturing structure is connected to the movable part. In the reversal of the principle, at least one camera is connected to the movable part and at least one capturing structure is connected to the base.

FIG. 3 shows the same design of a CMM as in FIG. 1. Alternatively, the machine can be a machine tool as in FIG. 4, for example. The reversal of the capture principle can also be applied to other designs of CMMs and machine tools, e.g. to CMMs of horizontal arm design or articulated arm design, and to correspondingly designed machine tools.

FIG. 3 shows schematically and in a simplified manner that an arrangement having a multiplicity of markers 31 can be situated outside the movement range of the movable part (here e.g. of the lower end region of the sleeve 6). For reasons of simplified illustration, in FIG. 3 markers 31 are arranged only behind the movement range. In practice, however, further markers can e.g. also be situated laterally, in the foreground and above the movement range. In the exemplary embodiment illustrated there are eleven rows each having nine markers 31, wherein some markers 31 situated behind the sleeve and behind the measuring head 7 and the probe 8 have been omitted for reasons of better discernibility of the illustration. In particular, each of the markers constitutes a capturing structure, wherein the speed, the temporal profile and/or the orientation of the movement can be determined by evaluation of the camera image of the marker.

Two cameras 33a, 33b are illustrated in the lower end region of the sleeve 6, said cameras being connected to the sleeve 6. Alternatively, more than two cameras or just one camera can be secured on the sleeve 6. The two cameras 33a, 33b illustrated in FIG. 3 are aligned in different directions. Marginal lines of their capture range are illustrated by dashed lines. In the state shown in FIG. 3, each of the two cameras 33a, 33b completely captures at least one of the markers 31. The completely captured markers 31 are identified by a plus sign in the drawing. Particularly if the markers 31 in each case have an individual structure or are individually configured in a manner discernible to the camera in some other way, information about the approximate position and/or alignment of the movable part can already be obtained from the identification of the capturing structure captured in the camera image and from the knowledge about the alignment of the capture range of the camera. If e.g. the sleeve 6 moves upward in the Z-direction from the state illustrated in FIG. 3, the marker illustrated with a plus sign in FIG. 3 would no longer be captured, rather a marker situated thereabove would be captured.

The capture ranges of the cameras 33a, 33b in FIG. 3 extend over a smaller solid angle than the capture ranges of the arrangements in FIGS. 1, 2 and 4. The respective captured capturing structure therefore occupies a larger part of the recorded camera image and it is therefore possible, in principle, to achieve a finer resolution and more accurate ascertainment of the speed of the movable part with simultaneous ascertainment of the position and/or alignment of the movable part on the basis of the identified marker and/or to reduce the number of pixels of the camera images, such that camera images can be recorded in particular with a higher repetition frequency.

Figure 5:
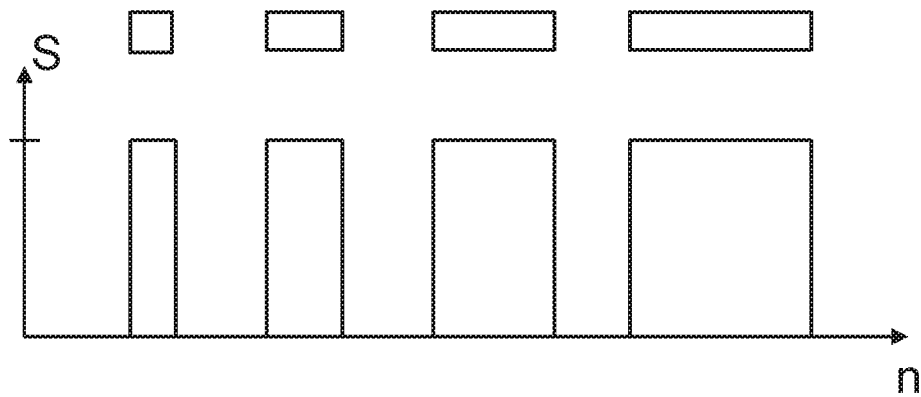
FIG. 5 shows a schematic illustration of various partial regions of a capturing structure having different dimensions and an associated image value distribution in a camera image, wherein no relative movement takes place between capturing structure and camera.
Figure 6:
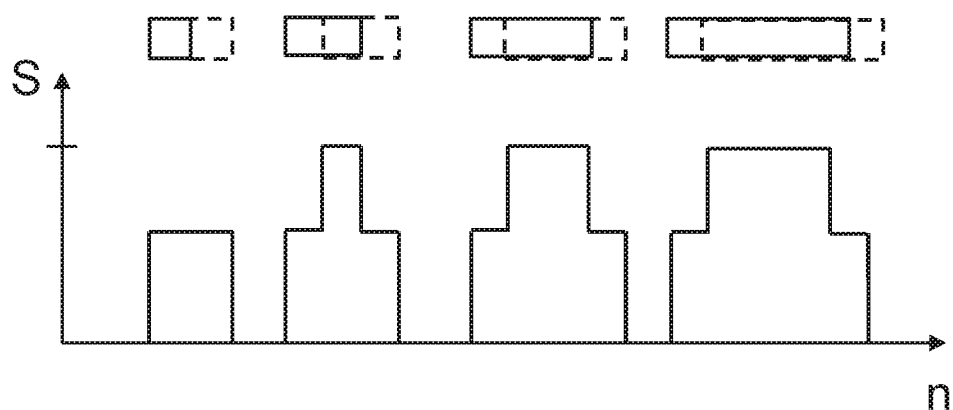
FIG. 6 shows a schematic illustration of the partial regions and of the associated image value distribution as in FIG. 5, but with a relative movement taking place between capturing structure and camera.
Figure 7:
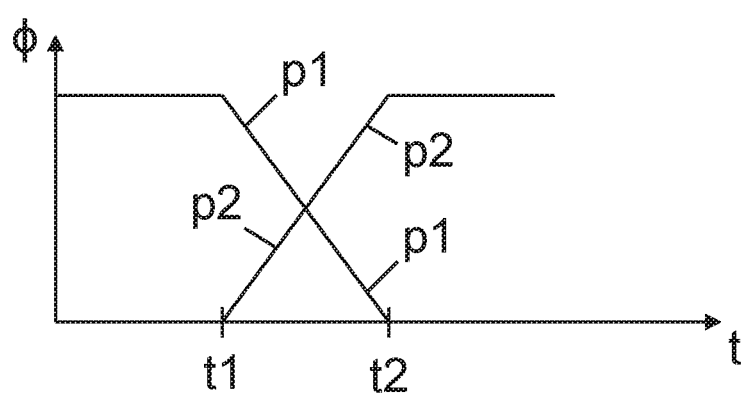
FIG. 7 shows temporal profiles of the radiant flux density captured by two pixels of the camera image for that partial region of the capturing structure which is illustrated at the top left in FIG. 6, during the relative movement.

With reference to FIGS. 5-7, on the basis of simplified examples an explanation is given regarding what effects a relative movement of a first part and a second part of a machine and generally also relative movements of arbitrary parts have if a camera is coupled to one of the parts and records a camera image of the other part. In accordance with FIG. 5, partial regions (represented by four rectangles having different widths at the top in the Figure) of a binary structure having different extents, that is to say partial regions of a movable part of the machine and in particular of the capturing structure, can be considered. In the simplified example, one-dimensional partial regions of the binary structure are considered, the dimensions of which in the width direction (from left to right in the Figure) are one, two, three and four image pixels. For the case where the partial regions are radiation-reflecting or radiation-emitting regions of an otherwise non-reflecting or non-emitting structure, FIG. 5 describes underneath the spatial profile of image values of corresponding pixels n of the camera image which capture the partial regions. Taking account of the optical properties of the captured partial regions and the imaging, the image values correspond to a maximum possible saturation S (maximum possible value of the integration of the radiation incident on the respective pixel over the exposure time) if the exposure time (integration time) of the camera is chosen accordingly. A prerequisite for the occurrence of the schematically depicted image value profile is that the object is not moved during image recording.

FIG. 6 illustrates the relationships if the object (here the binary structure) is set in motion abruptly at the point in time zero, is shifted toward the right by one pixel in the image space at a constant speed during the integration time (the position is symbolized by dashed rectangles), and then comes to rest once again abruptly. The spatial profiles of the saturation S and the image value profiles of the corresponding camera pixels n are once again illustrated below the partial regions.

FIG. 7 illustrates the radiant flux density $\Phi$ for two of the camera pixels p1 and p2 over the course of time. In this case, the exposure time interval begins at the point in time t1 and ends at the point in time t2. FIG. 7 illustrates the case only of the partial region having a size of one pixel on the left in FIG. 6. The radiant flux density received by the pixel p1 is at a constant level until the beginning of the exposure time interval at the point in time t1 and decreases linearly to the value zero during the exposure time interval. At the same time, the radiant flux density $\Phi$ of the second pixel p2 increases from the point in time t1 to the point in time t2 in a manner rising linearly to the same level which the radiant flux density previously had at the pixel p1.

The movement performed can be determined from the profile of the radiant flux density $\Phi$ for the pixels p1 and p2. However, the respective image value of the pixels p1 and p2, as shown in FIG. 6, yields the same value since integration is carried out over the integration time interval and the temporal profile during this time interval is not known. However, this is different for the spatial image value profiles in FIG. 6 for the wider partial regions. Since a radiation-reflecting and/or radiation-emitting partial region is situated in the central spatial region during the entire exposure time interval, the saturation S is a maximum there. The value is lower, however, at the margins of the image value profiles or saturation curves. A blurring of the edges situated at the ends of the partial regions in the direction of movement has taken place. This information can then be evaluated in order to determine the speed of the movement. The length of the regions of pixels n which have received radiation and integrated it during the exposure time interval already yields the absolute value of the constant speed or in general the average absolute value of the speed during the exposure time interval. In the exemplary embodiment illustrated, the partial region has moved further by one pixel and the length of the region of the exposed pixels or of the illustrated non-vanishing sections of the saturation curve is therefore greater than in the case in FIG. 5, specifically by exactly one pixel. The speed therefore results from division of the increase in length between the cases in FIG. 5 and FIG. 6, divided by the exposure time interval. The information in FIG. 5 corresponds to knowledge about the capturing structure captured with the camera image. In particular, the width of the four rectangular partial regions illustrated at the top in FIG. 5 is known beforehand. These partial regions can be identified by methods of image processing known per se despite the blurrings of edges in the camera image. In this case, with repeated recording and evaluation of camera images of the camera, in particular from frame to frame, an object tracking can take place, such that the complexity for the identification of the known partial regions or structures is low.

To return to the consideration of the transfer function of the imaging, which consideration was begun above, the transfer function changes with the movement. The transfer function therefore contains the information about the movement. In particular, the change in the transfer function can be considered in the case of a moving and a non-moving object (capturing structure) or the movement can be evaluated directly from the transfer function in the case of a moving object. It is possible here to have recourse in particular to a frequency analysis, in particular after transformation into the frequency domain (in particular Fourier transformation) and/or mathematical convolution. Besides an evaluation of image contrasts, e.g. at structure edges (this has already been discussed), a mathematical convolution of the image value distribution of the camera image for evaluating the movement is therefore also suitable and is actually preferred. The capturing structure which is captured by the camera can be produced in particular depending on the chosen method of evaluation and/or depending on the expected speed of the movement. Examples of suitable capturing structures have already been mentioned. Star targets are suitable e.g. as capturing structures having edges.

Exemplary embodiments of the determination of the speed from a convolution kernel are described below. For this purpose, firstly a description will be given of an underlying mathematical description of the imaging of the capturing structure onto the camera image as convolution of the intensity distribution of the capturing structure with a convolution kernel.

The gray-scale value distribution GW of the image of the capturing structure, which image is blurred under certain circumstances as a result of the camera recording, appears in the following formulae and equations. However, this is only one example of the distribution of the image values. By way of example, alternatively or additionally it is possible to take account of the color distribution, e.g. color values and color intensities. In the one-dimensional case, in which the gray-scale value distribution GW is dependent only on one spatial coordinate x, the gray-scale value distribution GW (x) can be described by the following integral equation (1):

$$GW(x) = \frac{1}{T}\int_{-T}^{0} I(x + v_x t)dt \quad (1)$$
$$= \frac{1}{T}\int_{x-v_x T}^{0} I(s_x)\frac{1}{v_x}ds_x$$
$$= \int_{-\infty}^{\infty} k(x - s_x)I(s_x)ds_x = (k * I)(x)$$

Equation (1) as an example in a simplification assumes that the relative speed $v_x$ of capturing structure and camera in the direction of the x-axis is constant during the exposure interval and proceeds in particular perpendicularly to the optical axis of the imaging. By way of the relationship $s_x = x + v_x t$, the speed $v_x$ is related to the time variable t and the travel $s_x$ covered by the movement in the direction of the x-axis:

$$t = \frac{s_x - x}{v_x} \quad (2)$$

T is the length of the exposure time interval, i.e. of the time interval over which the imaging of the capturing structure onto the camera image has taken place. I ($s_x$) is the intensity distribution of the non-blurred capturing structure to be imaged. The last line of equation (1) contains the replacement of the integral by a simplified notation of the convolution of the convolution kernel k with the intensity distribution I. The convolution is dependent on the spatial variable x. The following holds true for the convolution kernel k:

$$k(l) = \begin{cases} \frac{1}{v_x T} & l \in [0, v_x T] \\ 0 & \text{otherwise} \end{cases} \quad (3)$$

In this case, l is a spatial variable in the direction of the x-axis. The corresponding two-dimensional case is described below. The relative movement takes place at a constant speed with respect to direction and absolute value in an x-y-plane and proceeds perpendicularly to the optical axis of the imaging. The speed is therefore unambiguously described by its components $v_x$ in the direction of the x-axis and $v_y$ in the direction of the y-axis running perpendicularly to the x-axis. Accordingly, $s_y$ is the travel in the y-direction that is dependent on the time variable t and has been covered since the beginning of the exposure interval. The function $\delta$ is the Dirac function, also called delta distribution. Equation (4) accordingly reads:

$$GW(x, y) = \frac{1}{T}\int_{-T}^{0} I(x + v_x t, y + v_y t)dt \quad (4)$$
$$= \frac{1}{T}\int_{x-v_x T}^{0}\int_{y-v_y T}^{0} I(s_x, s_y)\delta\left(\frac{s_x - x}{v_x} - \frac{s_y - y}{v_y}\right)$$
$$\frac{1}{\sqrt{v_x^2 + v_y^2}}ds_y ds_x$$
$$= \int_{-\infty}^{\infty}\int_{-\infty}^{\infty} k(x - s_x, y - s_y)I(s_x, s_y)ds_y ds_x$$

Since the two-dimensional case is involved, two running variables are defined, namely $l_x$ in the x-direction and $l_y$ in the y-direction. The convolution kernel k is accordingly described by the following equation (5):

$$k(l_x, l_y) = \begin{cases} \frac{1}{T\sqrt{v_x^2 + v_y^2}} & l_x \in [0, v_x T], l_y \in [0, v_y T] \text{ and } \frac{l_x}{v_x} = \frac{l_y}{v_y} \\ 0 & \text{otherwise} \end{cases} \quad (5)$$

The gray-scale value distribution can therefore once again be expressed as convolution of a convolution kernel with the intensity distribution of the non-blurred capturing structure:

$$GW(x,y) = (k*I)(x,y) \quad (6)$$

As expressed by equation (1), last line, and equation (6) for simplified cases of constant speed perpendicular to the optical axis, the image value distribution of the image of the capturing structure captured by the camera can be expressed by the convolution of a convolution kernel k with the intensity distribution. Since the intensity distribution describes the capturing structure in the original state, not blurred on account of a movement, and since the state blurred by the movement in the camera image results from the image value distribution, the convolution kernel k contains the information about the speed of the relative movement which has led to the blurred camera image.

For the convolution kernel k it is then possible to define a length which is related to the speed by way of the exposure time or integration time and the imaging geometry. The speed can therefore be determined by the determination of the length. This of course firstly presupposes the determination of the convolution kernel. This will be discussed in even more detail. In particular, the capturing structure can be chosen such that the central spatial region of the convolution kernel that does not form the geometric margin of the convolution kernel contains a geometric partial structure of the convolution kernel and the length of this partial structure is the abovementioned length corresponding to the magnitude and/or direction of the speed.

A description is given below of examples of capturing structures in which said partial structure corresponds merely to the size of a single pixel of the camera image if the speed is zero (and if otherwise no imaging aberrations or other influences exist which lead to a blurring of the capturing structure in the camera image). By contrast, if the absolute value of the speed is not zero, the partial structure is enlarged, such that the size thereof can be described by the abovementioned length corresponding to the absolute value and/or the direction of the speed. By way of example, the partial structure can correspond to the size of two mutually adjacent pixels of the camera image. This means that from the beginning of the exposure interval until the end of the exposure interval a movement took place which led to the offset of the capturing structure by one camera pixel from the viewpoint of the camera. This applies in particular to the case of constant speed. The partial structure arises in the central region from the difference in the image values (e.g. gray-scale values or color values) with respect to the surroundings of the partial structure in the central region. By way of example, the partial structure is defined by constant image values in a continuous spatial partial region of the central region of the convolution kernel, while outside the partial structure in the central region constant image values are at a different image value level than for the partial structure. In particular, what can be achieved by suitable normalization of the convolution is that the image values of the partial structure have the value "1" in a possible image value interval of [0, 1], while the central region outside the partial structure is described by constant, lower image values, e.g. by the image values "0". However, since the convolution kernel can be interpreted in particular as a position function whose scaling corresponds to the matrix of the camera image, the central region of the convolution kernel is digitally structured in particular in accordance with the subdivision of the camera image into pixels. At the margins of the partial structure of the convolution kernel, there may therefore be unsharpnesses, i.e. image values between the inherently constant level of the image values of the partial structure and the inherently constant level of the image values outside the partial structure. In this case, it is nevertheless possible to determine the size of the partial structure and thus in particular the abovementioned length. Methods for determining the size of the partial structure are already known from image processing for the identification of objects which have unsharp margins in the camera image. They will therefore not be discussed in greater detail in this description.

As already mentioned, it is possible to determine not only the absolute value of the speed but also the latter's direction profile and/or temporal change from the geometry of the partial structure in the central region of the convolution kernel. In particular, a relative movement having a non-constant absolute value of the speed leads to image values in the partial structure of the convolution kernel which are not constant. The image values of the spatial regions corresponding to the pixels in the camera image (said spatial regions likewise being called pixels hereinafter for the sake of simplicity) can therefore have constantly high or constantly low values (e.g. only in a central region of the partial structure). However, it is also possible that on account of the type of increase or decrease in the absolute value of the speed even in a central region of the partial structure no constant values of pixels can be found, i.e. there are not two adjacent pixels whose image values are equal in magnitude. Nevertheless, it is possible to determine the size of the partial structure e.g. by the already known methods mentioned. From the profile of the image values along the extent of the partial structure, it is additionally possible to obtain information about the temporal profile of the speed during the exposure time interval. That is based on the insight that the pixels of the partial structure of the convolution kernel behave like the pixels of the camera image: In the case of a relatively slow movement, the respective pixel of the camera image acquires more radiation intensity than in the case of relatively slow movement if a corresponding spatial region with high radiation emission and/or high radiation reflectivity is imaged onto this pixel and a subsequent spatial region of the capturing structure in accordance with the movement has a lower radiation emission and/or radiation reflectivity. In the simplified example of equations (1) and (5) above, the running variable 1 corresponds to the extent of the partial structure in the direction of movement even though the examples were described for the simplified case of the constant speed. However, for a corresponding convolution kernel in the case of a non-constant speed, too, it is possible to define a corresponding running variable which has non-vanishing values only in the region of the extent of the partial structure. Particularly for the case where the direction of the movement also changes during the exposure time interval, it shall hereby be clarified again that the length of the partial structure of the convolution kernel is generally not a length to be determined in a straight direction, but rather is a length corresponding to the travel covered by the movement. An example will also be discussed with reference to FIG. 9.

Specific classes of capturing structures can be produced in a simple manner and enable a particularly simple and computation-time-saving determination of the convolution kernel. Moreover, the resultant partial structures of the convolution kernels can be evaluated particularly simply in particular in the manner described above. One such class of capturing structures is the so-called MURA (Modified Uniformly Redundant Arrays), which have the property that, when convolved with their inverse structure, they yield a single intensity peak. That corresponds to a mathematical delta function. In particular, the size of the structures of the in particular binary MURA used is coordinated with the geometry of the imaging and resolution of the camera image such that the intensity peak corresponds to a single pixel of the camera image. The corresponding spatial region of the abovementioned partial structure in the central region of the convolution kernel therefore has the dimensions of a single pixel if no blurring and no imaging aberrations occur. This coordination of the geometry of the imaging and the image resolution of the camera is preferred not only for MURA.

However, this condition cannot always be maintained depending on the type of motion tracking during the operation of the machine. By way of example, the geometry of the imaging changes with the distance between the capturing structure and the camera. In this case, corresponding corrections of the distance can be performed and/or the evaluation of the partial structure of the convolution kernel can be performed taking account of the altered geometry of the imaging. Preferably, therefore, the geometry of the imaging and in particular the distance between the capturing structure and the camera are determined and concomitantly taken into account.

Alternatively, the class of URA (Uniformly Redundant Arrays) is also suitable for simple determination and evaluation of the convolution kernel. URA when convolved with themselves yield a delta function peak as a result.

Figure 8:
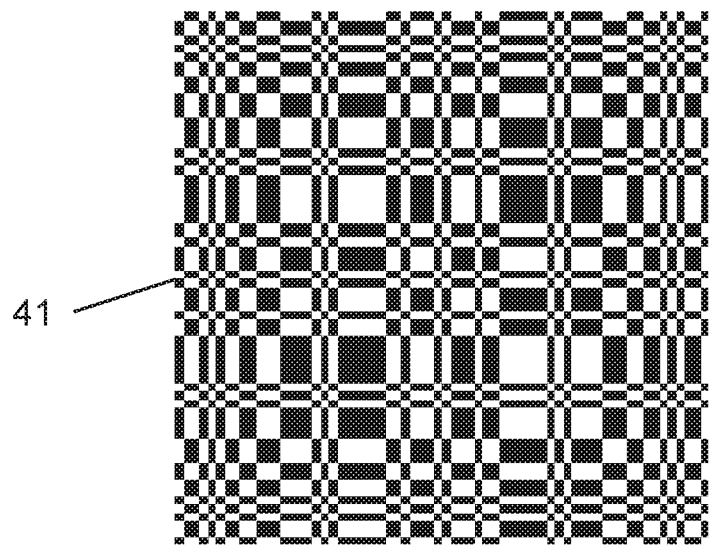
FIG. 8 shows a MURA (Modified Uniformly Redundant Array) as an example of a part of a capturing structure whose camera image can be evaluated with little complexity for determining the speed of the relative movement, FIG. 9 schematically shows, in a single illustration, a convolution kernel as a two-dimensional position-dependent function, wherein in a central region of the convolution kernel for two different cases of a partial structure the illustration shows on the basis of what geometric properties the speed of the relative movement can be determined.

Both MURA and URA are in particular binary structures. By way of example, they are chosen for the determination of the convolution kernel such that only the image values normalized to the interval [0, 1] occur. One example of a MURA 41 is illustrated in FIG. 8. The structure that is point-symmetrical with respect to the center point of the illustrated area of the MURA is evident.

In the case of a capturing structure having partial structures created using the Barker code, the convolution kernel in the case of the relative speed 0 has the following properties:

In a generalization of equations (1) and (6) above, the convolution kernel can be determined by applying to the convolution (on the right of said equations) that operation which eliminates the intensity distribution of the capturing structure. The type of operation is therefore dependent in particular on the type or class of the capturing structure. In the case of MURA, for example, the expression which describes the convolution of the convolution kernel with the intensity distribution of the capturing structure is convolved with the inverse capturing structure. Therefore, the corresponding operation merely has to be applied to the grayscale value distribution obtained and the convolution kernel k results. In the case of URA, this is the convolution of the image value distribution with the intensity distribution of the capturing structure. Therefore, just a single convolution operation is required to determine the convolution kernel. In particular, as already mentioned, an imaging aberration of the imaging can be concomitantly taken into account also in the evaluation of the convolution kernel. In particular, in a previously performed calibration of the motion-measuring system for at least one relative position and preferably for different relative positions of capturing structure and camera, it is possible in each case to determine a convolution kernel when no relative movement takes place. By evaluating the convolution kernel, it is possible to determine the result of the imaging aberration and to take it into account during the later actual operation of the motion-measuring system.

Figure 9:
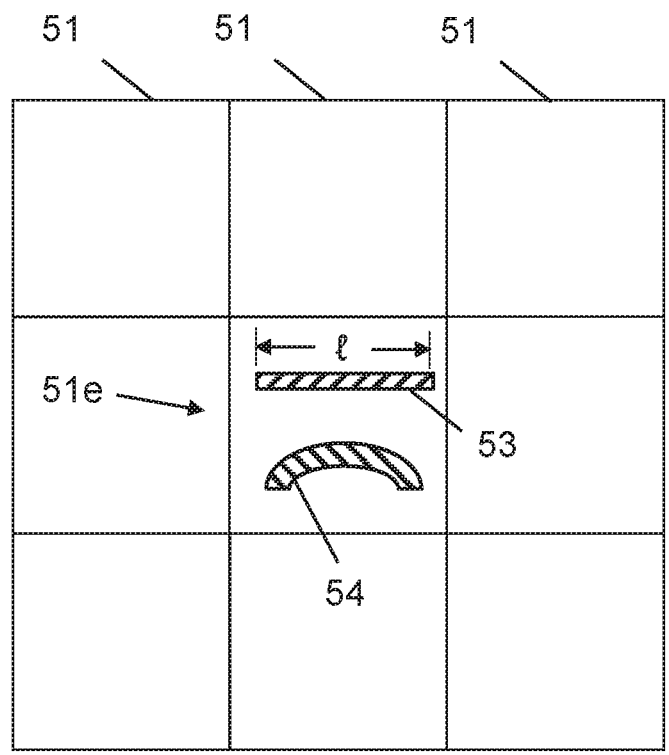

Preferably, a capturing structure is composed of a plurality of mutually adjoining partial regions which produce a total area without gaps in the manner of tiles. One example is the total area composed of nine tiles composed of three rows each having three partial regions, which is illustrated in FIG. 9. Three of the tiles, namely the tiles in the first row, are designated by the reference sign 51. The partial region or the tile in the center of the arrangement is designated by the reference sign 51e. Each of the partial regions is preferably formed by the same pattern, such that the patterns are repeated periodically on account of the tiling. It is also possible by means of patterns and inverted patterns in adjacent partial regions to produce such periodic structures as capturing structure. The periodic structures have the advantage that marginal effects on account of the finite dimensions of the capturing structure when determining the convolution kernel in the central region have no or only minor effects. Depending on the number of central patterns not producing the margin of the entire capturing structure, there is one or a plurality of central regions each containing the abovementioned partial structure of the convolution kernel, which can be evaluated for determining the relative speed. A plurality of such central regions can optionally be evaluated simultaneously or successively. This makes it possible, in particular, to increase the accuracy when determining the speed, if marginal effects can still also be ascertained in the central region and/or if other effects such as, for example, statistical fluctuations of the image signals of the camera sensors (noise) occur.

The illustration in FIG. 9 can be understood as a schematic illustration of a convolution kernel that arises as a result of convolution of the image value distribution from a camera image. Two partial structures 53, 54 are illustrated in the central region 51e, which partial structures cannot be observed simultaneously in the same convolution kernel, but rather represent the possible variants of the partial structure. The partial structure 53 is e.g. a rectilinear structure resulting from pixels lined up one behind another from right to left in the Figure. The length l corresponds to the absolute value of the relative speed taking account of the geometry of the capturing structure and the geometry of the imaging. The direction of the movement at the constant speed can also be inferred from the partial structure 53 if this is of interest and is not already known from the properties of the machine.

The partial structure 54 has a bent profile since the speed has changed its direction during the exposure time interval. The bent profile corresponds to the bent travel of the movement. Although not illustrated, the length of the partial structure 54 can be determined as the length of the bent profile. The absolute value of the speed or the average value of the absolute value of the speed is determined as a result. The bent profile contains the information about the direction of movement.

If the capturing structure extends in a plane which does not run perpendicularly to the imaging of the optical axis, the imagings of the individual tiles having inherently identical patterns are imaged as different patterns in the camera image. This can be taken into account, however, in particular using information about the inclination of the plane relative to the optical axis before, during and/or after the evaluation of the camera image.

Figure 10:
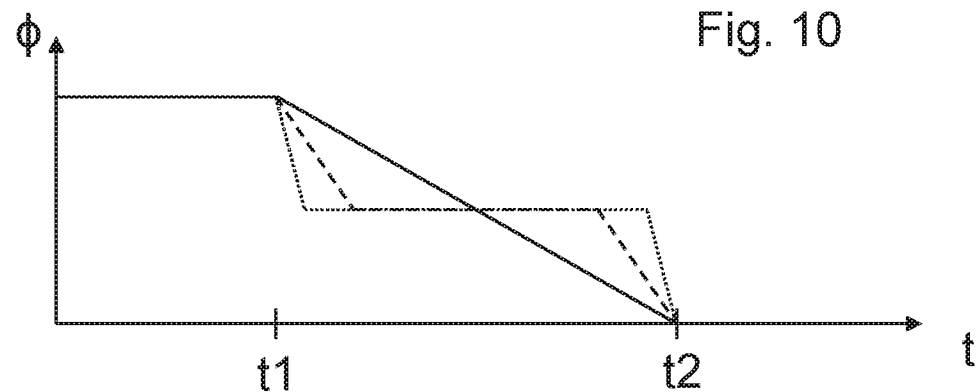
FIG. 10 shows examples of the temporal profile of a radiant flux density in the case of three different movements, wherein it is not possible to differentiate between the three different movements by integration of the quantity of radiation over the exposure time interval alone.

FIG. 10 shows temporal profiles of the radiant flux density $\Phi$ on a sensor element of the camera which generates a camera image pixel, the profiles for three different movements being illustrated. The camera pixel contains the integrated information about the radiation received by the sensor element over the exposure time interval, which begins at the point in time t1 and ends at the point in time t2. In all three cases illustrated, the movement begins at the point in time t1 and ends at the point in time t2. Until the point in time t1, that is to say until the beginning of the exposure time period, the sensor element receives radiation at a maximum radiant flux density. As a result of the movement, however, the radiant flux density decreases to zero by the end of the exposure time interval at the point in time t2. A first movement takes place at constant speed during the exposure time interval. (solid line of the radiant flux density profile). A second movement proceeds at constant speed in the first part of the exposure time interval, then stops and is continued toward the end of the exposure time interval at constant speed again in the same direction as before (dashed line of the radiant flux density profile). Furthermore, the radiant flux density profile for a third movement similar to the second movement is illustrated, wherein, however, the time period of the interruption of the movement is greater in the middle of the exposure time interval and the absolute value of the speed is therefore also greater at the beginning and at the end of the exposure time interval. Said third profile is represented by a dotted line.

In all three cases, the sensor element receives the same quantity of radiation. This follows from the illustration in FIG. 10 by integration of the radiant flux density profiles over the time interval from t1 to t2. All three areas below the radiant flux density profiles are of the same magnitude. Therefore, the sensor element and the information supplied by it cannot be utilized to identify the movement profile during the exposure time interval. However, this only relates to the illustrated ideal profile of the movements which begin exactly at the point in time t1 and end exactly at the point in time t2. This also relates to the consideration of just a single pixel. As has already been explained, information about the temporal profile during the integration time interval can be obtained on the basis of the consideration of a plurality of pixels. However, a description is given below of the fact that even just the consideration of a single camera pixel leads to a possibility of increasing overall the information content about the profile of the movement in the camera image.

Figure 11:
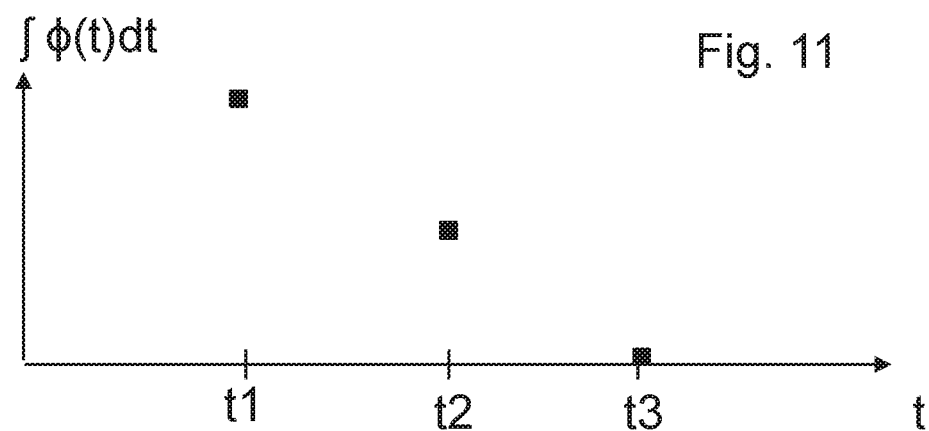
FIG. 11 shows integrated quantities of radiation of a pixel of a camera image over the course of time for the three movements for which the temporal profiles of the radiant flux density are illustrated in FIG. 10.

FIG. 11 shows the radiant flux density $\int \phi(t)dt$ integrated over an exposure time interval of a sensor element. The integration value yielded by the sensor element is represented by a small dark rectangle in each case at the end of an integration time interval at the points in time t1, t2 and t3. In this case, a movement takes place which corresponds to the radiant flux density profile represented by a solid line in FIG. 10, that is to say that the speed is constant during the integration time interval between the points in time t1 and t2 and is zero beforehand and afterward. Therefore, the integration value is at the maximum possible value at the point in time t1. The integration value is at 50% of the maximum value at the point in time t2 and the integration value is zero at the point in time t3 (that is to say a complete integration time interval after the end of the movement).

Figure 12:
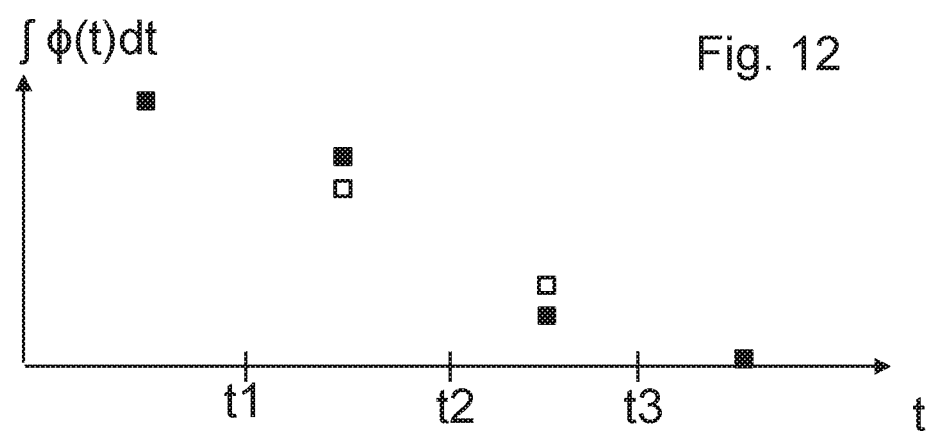
FIG. 12 shows integrated quantities of radiation of the pixel in a manner similar to that in FIG. 11, but with the integration time periods being temporally offset relative to the integration time periods of the illustration in FIG. 11.

FIG. 12 shows the integration values for a situation modified by comparison with FIG. 11. The modification consists in the fact that the duration of the integration time intervals was not changed, but the points in time of the beginning and end of the respective integration time interval were changed. The same results would be obtained if the beginning and end of the time interval of the movement at constant speed had shifted.

The situation is discussed below in which, as in FIG. 11, the temporal profile of the radiant flux density that is incident on the sensor element is represented by the solid line in FIG. 10. However, the exposure time interval always begins in a manner offset by half a time interval by comparison with the situation described with reference to FIG. 11. The integration value in the illustration in FIG. 12 is therefore still at the maximum value at the time of half an integration time interval before the point in time t1. At the end of the next integration time interval, exactly in the middle between the points in time t1 and t2, however, the integration value is only one quarter below the maximum value at the end of the next integration time interval. In the middle between the points in time t2 and t3, the integration value is one quarter of the maximum value. It is only at the end of the following integration time interval after the point in time t3 that the integration value is zero, since the movement only ends at the point in time t2 and only the integration time interval ended after the point in time t3 is a complete integration time interval in which no radiation was received.

By contrast, if the movement takes place which in FIG. 10 corresponds to the profile of the radiant flux density that is represented by a dashed line, two other integration values are obtained between the points in time t1 and t3, said integration values being represented by rectangles that are not filled in dark in FIG. 12. This is owing to the fact that in the integration time interval that ends between the points in time t1 and t2, the radiant flux density fell faster but in the integration interval that ends between the points in time t2 and t3, the radiant flux density did not yet fall as fast in relation to the other illustrated case with the solid line in FIG. 10.

The conclusion can be drawn therefrom that the position of the integration time interval has an influence on what integration values and hence image values are yielded by the individual sensor elements of the camera matrix.

This insight can be utilized in various ways to increase the information content about the temporal profile of the movement and to determine information about the temporal profile of the movement by evaluation of the camera image or of a plurality of camera images. This enables in particular the simple determination of absolute value and direction of the speed, that is to say of the speed vector. In all cases, information is captured by at least one camera which contains quantities of radiation integrated over different integration time periods. A single camera can already yield a camera image whose pixels are integration values of integration time periods that are temporally offset but e.g. equal in length. Such cameras are also referred to as so-called rolling shutter cameras. With the use of a single camera with temporally offset integration time periods, it is preferred for the capturing structure captured overall by the camera image to contain redundant information in different partial regions. By way of example, the camera captures a first half of the capturing structure with the upper half of the camera image and the second half of the capturing structure with the lower half of the camera image. If the integration time periods of the upper half and of the lower half of the camera image differ and the first half and the second half of the capturing structure contain redundant structure information, the information content in the camera image is increased. Alternatively or additionally, it is possible to use a plurality of cameras whose integration time periods differ.

In all cases, the integration time periods cannot or cannot only differ in the fact that they are temporally offset relative to one another. Rather, the duration or length of the integration time periods can (also) differ.

A further consideration clarifies that the speed of the movement and/or the temporal profile of the movement can be determined from one or a plurality of camera images having image information which originates from different integration time periods of the integration of radiation. To put it generally, therefore, the camera image can comprise pixels whose image values correspond in each case to a quantity of radiation integrated over an exposure time interval, wherein the exposure time intervals of different pixels of the camera image differ from one another and wherein the speed of the relative movement and/or information about a temporal profile of the movement are/is determined taking account of information about the different exposure time intervals. Just from a single camera image having image information originating from different integration time periods, it is possible to determine the orientation and/or the temporal profile of the movement.

By way of example, if a linear structure that moves transversely with respect to the longitudinal extent of the line is captured with pixels from integration time periods offset relative to one another, this results in an offset of the line. By way of example, if a first pixel records one end section of the line over a first time interval, a second pixel records the central section of the line over a second time interval, which is offset by one third relative to the first time interval, and a third pixel records the other end section of the line at a third time interval, which is offset by two thirds relative to the first time interval, three lines respectively corresponding to one third for the three sections of the original line arise in the entire camera image. Taking account of the time offset of the time intervals, it is possible to calculate the speed and/or to determine the temporal profile of the speed and/or the orientation of the movement. The arrangement of the three lines in the camera image differs depending on the orientation.

Therefore, the capturing structure is preferably designed such that it contains information (for example edge profiles or a known binary structure) which can be utilized in different time intervals of the radiation integration for determining the speed. By way of example, what can be achieved by means of a corresponding choice of the object contents of the capturing structure is that the blurring in the camera image can be calculated in order subsequently to calculate the speed from the offset in the partial regions (e.g. rows) of the image.

In particular, a digital camera known per se can be used which has a sensor matrix having at least one row of sensor elements whose integration values are read out successively in the order of the sensor elements along the row and are utilized as image values of the pixels of the camera image. The row speed results from the duration for reading out the image values of a row. In the case of a two-dimensional sensor matrix having sensor elements arranged in rows and columns, the individual rows (or alternatively the individual columns) can be read successively at the row speed. In particular, the speed can therefore be determined from the spatial offset (i.e. a position displacement) of the camera image of the capturing structure captured by different rows or different columns of a two-dimensional camera image.

An image of a capturing structure that is recorded by an individual row of sensor elements initially cannot be distinguished from the speed zero if the capturing structure moves at the row speed of the camera. However, unlike in the case of a non-moving object, the movement of the object (of the capturing structure) leads to a blurring, depending on speed and exposure time of the individual sensor elements. As described elsewhere in this description, it is therefore possible to determine the speed on the basis of the blurring or alteration of the image of the capturing structure in relation to the non-moving capturing structure.

To put it more generally, it is therefore preferred to combine the knowledge about the different integration time intervals with the speed measurement taking account of the information about the actual appearance of the capturing structure. In particular, the capturing structure is therefore designed and produced such that they enable a determination of the relative movement of camera and capturing structure both on the basis of blurrings and by virtue of effects of the different integration time intervals.

A plurality of cameras, at least two cameras, having in particular an equal number of rows and columns of the sensor elements and an identical row speed can advantageously be used. In this case, however, the order in which the quantities of radiation integrated over the individual integration time intervals by the sensor elements are read out as image values differs in the case of the different cameras. For example when reading out the image values of two cameras, the read-out at the first camera can begin with the sensor element in the first row and the first column (or with the first sensor element in the case of row cameras) and the read-out at the second camera can begin with the sensor element in the last row and the last column (or with the last sensor element of the row in the case of row cameras). Commercially available cameras read out the image values simultaneously row by row. In this case, the read-out can begin for example with the first row in the case of the first camera and with the last row in the case of the second camera. In a different configuration, the read-out can begin in the central region of the matrix (e.g. with respect to the rows and/or the two-dimensional matrix) simultaneously for both or all of the cameras, but with the sensor elements being read in an opposite order. With simultaneous read-out row by row, the read-out begins for example with the last row of the first half of the rows in the case of the first camera and with the first row of the second half of the rows in the case of the second camera. The read-out takes place in particular at the same row speed and successively row by row in the case of two-dimensional matrices. This can generally be referred to as crossed read-out. In this case, the matrices of the sensor elements of the different cameras are aligned with the capturing structure in particular in the same way, that is to say that the same or approximately the same region of the capturing structure is captured by the first sensor element of the respective camera. The crossed read-out can be achieved in a simple manner for example by two cameras of identical type with rolling read-out being aligned with the capturing structure in a manner rotated by 180° relative to one another with their optical axes. By way of example, firstly the cameras can be aligned with the capturing structure in an identical way and then one of the cameras can be rotated by 180° about its optical axis.

This specific example clarifies that solely by taking account of the spatial offset of the simultaneously recorded camera images of the two cameras, information about the relative movement is recorded which is preferably utilized for determining the speed and/or at least one other climatic variable of the movement.

Particularly with the use of more than two cameras, it is preferred for the order of reading the sensor elements to differ for all of the cameras and/or for mutually corresponding sensor elements that capture the same region of the capturing structure to be read in a temporally offset manner for the different cameras.

As a result of the different order of read-out, particularly in the case of more than two cameras, a homogenization of the resolution capability of the camera ensemble during the capture of the movement in different spatial directions is achieved, such that it is possible to measure the object speeds in the different spatial directions with approximately the same accuracy.

It is advantageous to produce the capturing structure in such a way that it does not contain any periodic structure elements leading to ambiguous images in the planned object speed spectrum, as is the case e.g. for an apparent reverse rotation of a forward rotating spoke wheel with a film camera at corresponding repeated frequencies of the image recording.

The temporally offset operation of a plurality of cameras is also a possibility for increasing the resolution of the speed measurement. Alternatively or additionally, said temporally offset operation enables a motion measurement with determination of depth information.

A further advantageous possibility for avoiding the problem that irreversible or ambiguous results can occur for specific combinations of speeds and object contents consists in the use of rolling shutter read-out methods in more than one camera, in which not just one read-out direction occurs. Examples in this respect have already been mentioned. In particular, it is also possible to change the read-out order when reading out the image values of respectively the same camera in particular after the read-out of a complete camera image. Alternatively or additionally, it is also possible to employ read-out methods which combine rolling read-out for forming a camera image in the case of at least one camera with simultaneous reading of all the sensor elements for forming a camera image in the case of at least one other camera, in which the read-out frequencies differ for the various cameras of the ensemble. It is thereby possible to ensure that unambiguous image information is recorded.

Alternatively or additionally, the capturing structure can be altered over the course of time, for example using at least one display, and/or different structure elements can be realized by different colors (by reflection and/or emission of radiation). Color-sensitive cameras are used in the last-mentioned case. However, this is based on the same basic approach as with the use of cameras or camera regions having different integration time intervals. Temporal variability of the capturing structure can be achieved for example by virtue of the capturing structure comprising at least one display which alters a gray-scale value distribution represented by the display over the course of time. In this case, the state of the gray-scale value distribution can be chosen depending on at least one parameter of the machine. In this way (in the frequency domain) the state of the capturing structure (in particular the frequency content of the capturing structure) can be adapted to the instantaneous speed (intended by the drive controller for example) to be measured.

In one embodiment, the continuous gray-scale value distribution can be represented on at least one self-luminous display in an operating-parameter-dependent manner, wherein the pixel rasterization of the display is small in particular in comparison with the resolution of the imaging onto the camera image. In particular, the information about the measured speed of the movable part of the machine and optionally also of the position determined from the camera image can be used to define beforehand the partial region to be evaluated of the camera image, taking account of the planned trajectory of the movement with an optional safety allowance for expected path deviations. In this way, from individual images it is possible to generate the controlled variable of actual speed and also optionally actual position for the control of the movement of the movable part.

The information obtained from the speed measurement can in particular also be used to correct the blurrings of the capturing structure in the camera image. It is thus possible to increase the resolution and/or the accuracy for a determination of the position of the movable part by evaluation of the camera image.

Stereoscopic images can be used for stabilizing measurements of position and speed components in the direction of the optical axis or approximately in the direction of the optical axis of the imaging. This does not exclude the use of more than two cameras, rather for example three or four cameras, and the joint evaluation of their images for example taking account of the position and alignment of the camera. In this way, depth information can be obtained, that is to say that a 3D image of the movable part can be created and evaluated. In this case, it is possible to employ for example known methods of separating polarized radiation by means of polarization filters or separating radiation of different wavelengths (colors). In stereoscopic methods, too, it is additionally possible to evaluate different camera images and/or partial regions of camera images taking account of different exposure time intervals, as has already been described.

Machines of gantry design were described above merely as an example of a specific type of machine. The three linear movement axes can be referred to as stacked or cascaded movement axes since a movement of the respectively logically superordinate movement axis in the stack or the cascade leads to a movement of all the subordinate axes in the stack or the cascade. In practice, however, not just stacked movement axes with linear movements occur. Rather, at least one axis can be a rotation axis, that is to say that a rotational movement takes place when the movement is performed. It is also possible to stack or to cascade exclusively rotational movement axes.

Hitherto, in conventional configurations of the open-loop control and/or closed-loop control of the movement at least with regard to one movement axis of a machine, a coordinate system related to the respective axis has been taken as a basis for the measurement of the movement. If, in an axial stack sequence, for example, a motion measurement takes place in relation to an axis which is not the first axis in the stack sequence, the coordinate system moves relative to the stationary machine coordinate system (which can also be referred to as laboratory system or world coordinate system) if a movement of at least one superordinate axis takes place. The measurement according to the invention of a movement now makes it possible, in a simple manner, to measure the movement of the movable part of a machine in relation to the laboratory coordinate system. For this purpose, either the at least one camera (as already described above on the basis of examples) can be arranged on the base of the machine and thus fixedly in the laboratory coordinate system or the capturing structure can be arranged fixedly on the base and the camera can be concomitantly moved with the movable part. The number of cameras used depends in particular on the type of motion measurement and/or on the design of the machine and also on the movement range to be captured.

In particular, therefore, for generating the respective kinematic variable (such as position, speed and/or acceleration) of the movement, it is possible repeatedly to record a camera image and to determine the kinematic variable for each of the camera images. As a result, the value of the kinematic variable can be determined in each case in an up-to-date manner for the camera image last recorded. Optionally, the orientation and/or the temporal profile of the movement can also be determined repeatedly in each case from one of the camera images. In particular, local measuring systems on moving parts (e.g. with scale graduations and optical reading heads on moving parts that only yield pulse signals upon the capture of a graduation marking) can therefore be replaced by the camera image evaluation according to the invention. Tachometers of drives can also be replaced thereby.

During the repeated capture of the capturing structure, it is possible for the capturing structure or partial regions of the capturing structure to be tracked with regard to the relative movement thereof, in particular to be identified in each case from the different camera images recorded successively. By way of example, use is made here of a plurality of cameras by which the movement of the same movable part is tracked. This also includes the already mentioned case where the plurality of cameras on the movable part are concomitantly moved and capture at least one stationary capturing structure.

Overall, it is therefore possible, in particular, to implement the open-loop control and/or closed-loop control of the movement of a movable part via at least one corresponding drive (e.g. electric motor) on the basis of at least one kinematic variable which is defined in the laboratory coordinate system and is measured directly in said coordinate system. A conversion from a concomitantly moved coordinate system into the laboratory coordinate system can therefore be obviated. A corresponding calibration by alterations of the position of the concomitantly moved coordinate system e.g. depending on the respective operating state (for instance in the case of varying loading of a movable part of the machine or in the case of different temperature levels or temperature distributions) is also obviated.

In particular, the open-loop control and/or closed-loop control of the movement of the movable part can be performed using kinematic variables of the movement that are determined repeatedly from the camera images. In particular, both the position of the movable part and the latter's speed and/or acceleration are determined from each camera image. Since only a single, up-to-date camera image is required for the speed determination, the speed measurement value is present for the open-loop control and/or closed-loop control of the movement with just a small delay after the recording of a single camera image. The reaction time of the open-loop control and/or closed-loop control is therefore shorter than when a plurality of successively recorded camera images are evaluated. Disadvantages that occur in the case of known open-loop control systems and/or closed-loop control systems such as oscillation of the output variable of the open-loop control and/or closed-loop control on account of delayed determination of the measurement variable can therefore be avoided or at least reduced.

For a simple position controller it is sufficient to capture the up-to-date actual position (controlled variable) and accordingly to determine the manipulated variable, e.g. the setpoint travel speed with respect to the movement axis, on the basis of the control deviation (that is to say difference between setpoint position and actual position) and to forward it to the drive train (controlled system).

Figure 13:
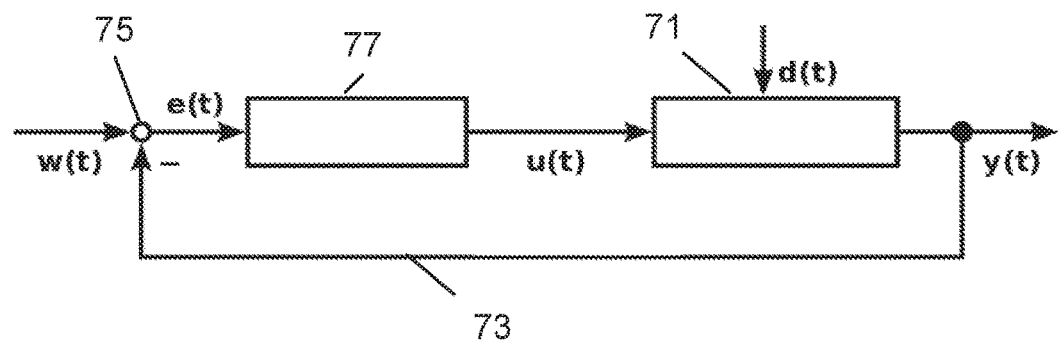
FIG. 13 shows one example of a simple position controller for controlling the position of a movable part of a machine.

FIG. 13 shows one exemplary embodiment of a simple position controller. y(t) stands for the controlled variable at the output of the controlled system 71, which can be influenced e.g. by a disturbance variable d(t). Via a feedback 73, the controlled variable y(t) is fed to a comparison device 75, which thus compares the actual position with the value of a reference variable w(t) and feeds the comparison result e(t) to the controller 77. At the output of the controller 77, the manipulated variable u(t) is output to the controlled system 71.

A controller adapted to the controlled system is able, even with conventional capture of the controlled variable at the output of the controlled system, to reduce the control deviation e(t) to a minimum and thus to set the position to be controlled to the requested setpoint position w(t) and to maintain it with a tolerance. As is evident from FIG. 13, the controller 77 directly takes into account only the position deviation e(t), but not the speed at the current time when the control process is performed, and hence not the deviation with respect to the setpoint speed either. The current actual speed can indeed be calculated within the controller 77 (e.g. the transfer function thereof), by calculating the difference with respect to an earlier position. However, obsolete information is concomitantly taken into account here, namely the earlier position from an earlier cycle of the performance of the control.

This has the consequence that although the control deviation e(t) is approximately zero, the speed of the movable part at the location of the setpoint position is not zero. This is the case primarily if the controlled system performs a usually high-frequency mechanical oscillation. Although previous controllers compensate for this for predefined frequency ranges or suitable combinations of resonant frequencies of the controller and of the controlled system, they cannot completely eliminate the effect of oscillations in many cases.

It is proposed, then, to use a closed-loop control for controlling the movement of a movable part of a machine which also uses a speed measurement value (if appropriate as a difference between a setpoint speed and an actual speed) besides the information about the actual position (if appropriate in the form of a deviation with respect to the setpoint position). In particular, such a closed-loop control can be a cascade closed-loop control, that is to say that a first controller (e.g. the position controller) and a second controller (e.g. the speed controller) are connected in series, i.e. cascaded. Optionally, moreover, the acceleration can also be utilized as input variable by the closed-loop control in particular in a further cascaded stage of the closed-loop control as measured actual variable (if appropriate as difference between a setpoint acceleration and an actual acceleration).

Figure 14:
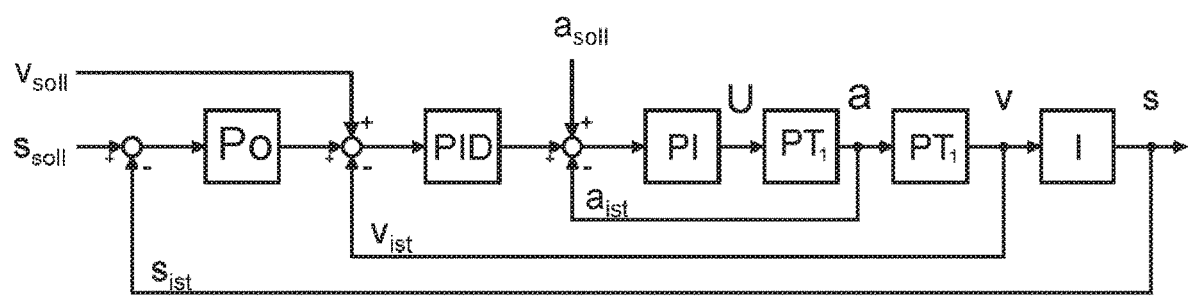
FIG. 14 shows a cascaded control for controlling the position and speed and optionally also the acceleration of a movable part of a machine as an example of a control which takes account of the actual value of the speed of the movable part, said actual value being determined from an individual camera image, FIG. 15 schematically shows positions of a circular marker in the case of a movement at constant movement speed in a rectilinear direction, a profile of image values of a sensor array along the direction of movement and a temporal intensity profile during the exposure time interval, wherein the radiation transmitted from the marker to the sensor array of a camera is not varied over time with regard to the intensity.

FIG. 14 shows one exemplary embodiment of such a cascaded closed-loop control. In FIG. 14, s denotes the position of the movable part, v denotes the speed of the movable part and a denotes the acceleration of the movable part. These three kinematic variables which describe the movement of the movable part and which are available for measurement in each case at the output of a corresponding part of the controlled system, for the purpose of forming the control deviation, are also differentiated by the index "actual" for the actual value and by the index "setpoint" for the setpoint value.

While the position s can be measured by means of conventional position-measuring systems of machines, such as e.g. with scale graduation and optical reading head, and/or is determined directly from a single camera image of the motion-measuring system according to the invention, the speed is preferably determined directly from a camera image. In conventional systems, by contrast, the speed is determined e.g. by an electrical voltage applied to a DC motor and/or by measurement of the rotational speed e.g. by means of a tachometer. Conventionally, the acceleration a can be determined by the current fed to the DC motor. Alternatively, at least one acceleration sensor can be arranged on the movable part. While this conventional determination of the acceleration is also possible, it is preferred for the acceleration to be determined either directly from the profile of the movement during the integration time interval of the camera image and/or from the temporal profile of the speed which is determined from a sequence of a plurality of camera images.

The closed-loop control illustrated in FIG. 14 is merely one specific exemplary embodiment of a closed-loop control which uses the speed determined directly from a camera image. Alternative configurations of such a closed-loop control are possible. By way of example, it is possible for the acceleration not to be a measurement variable and instead e.g. to be determined by a calculation from the speed or to be disregarded. The exemplary embodiment specifically illustrated in FIG. 14 comprises a comparison device at its input illustrated on the left, which comparison device compares the setpoint position $s_{setpoint}$ with the actual position $s_{actual}$ and feeds the result to a first controller, the position controller Po. Said controller can be e.g. a proportional controller. At the output of the position controller Po, the output manipulated variable, e.g. a speed, is fed to a further comparison device, which compares this manipulated variable in particular with the measured actual speed $v_{actual}$ and the setpoint speed $v_{setpoint}$ and feeds the corresponding control deviation to a speed controller PID, which is e.g. a controller having proportional, integral and derivative components. At the output thereof, the corresponding manipulated variable is fed to a further comparison device, which compares e.g. an acceleration with the actual acceleration $a_{actual}$ and the setpoint acceleration $a_{setpoint}$. The corresponding control deviation is fed to an acceleration controller PI, which may be e.g. a proportional and integral controller. The manipulated variable U for the controlled system is present at the output of said acceleration controller PI.

In FIG. 14, the controlled system is symbolized by a first PT1 element for modelling a temporal delay, at the output of which the acceleration a is measurable. A further PT1 element connected downstream models a further delay, at the output of which the speed v is measurable. Yet another element I models an integrating effect of the controlled system, at the output of which the position s is measurable.

FIGS. 15-18 show in each case the position of a circular marker, which is part of a capturing structure captured by a recording image, at four different points in time during a single exposure time interval. In each of the exemplary embodiments in FIG. 15-18, the marker moves relative to the camera in a rectilinear direction. The position variable of the rectilinear direction is designated by x. Above the circles filled in by hatchings, which circles represent the marker at the respective position, there is in each case a time indication denoting the point in time at which the marker is situated at the respective position. In each case the points in time t0 (at the beginning of the exposure time interval), the point in time t0+τ/3 (when one third of the exposure time interval has elapsed), the point in time t0+2τ/3 (when two thirds of the exposure time interval have elapsed) and the point in time t0+τ at the end of the exposure time interval are indicated in FIGS. 15 to 18.

Situated underneath that in each of FIGS. 15 to 18 is a diagram in which the quantity of radiation S(x) emanating from the marker over the entire exposure time interval and received by the sensor elements of the camera is plotted as a function of the position x. That corresponds to the signal strength of the sensor at the corresponding position in the recording image. At the point in time t0, the marker is situated in each case at the position x0. However, it is not the case in all of FIGS. 15 to 18 that the marker is situated at the position the furthest away from the position x0 at the point in time of the end of the exposure time interval. This is only the case in the cases of FIGS. 15 and 16. By contrast, the movement reverses at the point in time t0+τ/3 in the cases of FIGS. 17 and 18.

Figure 15:
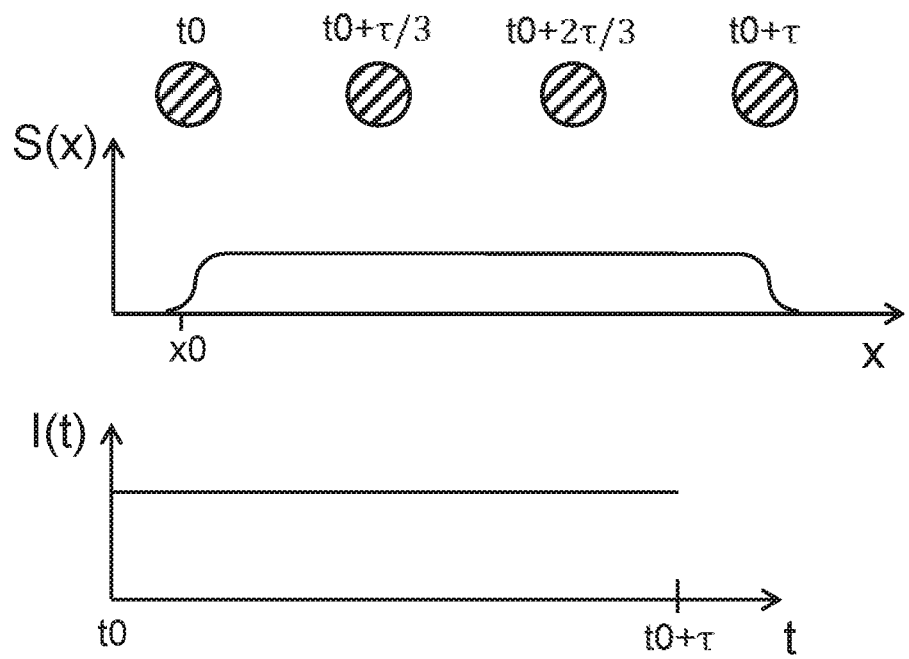
Figure 16:
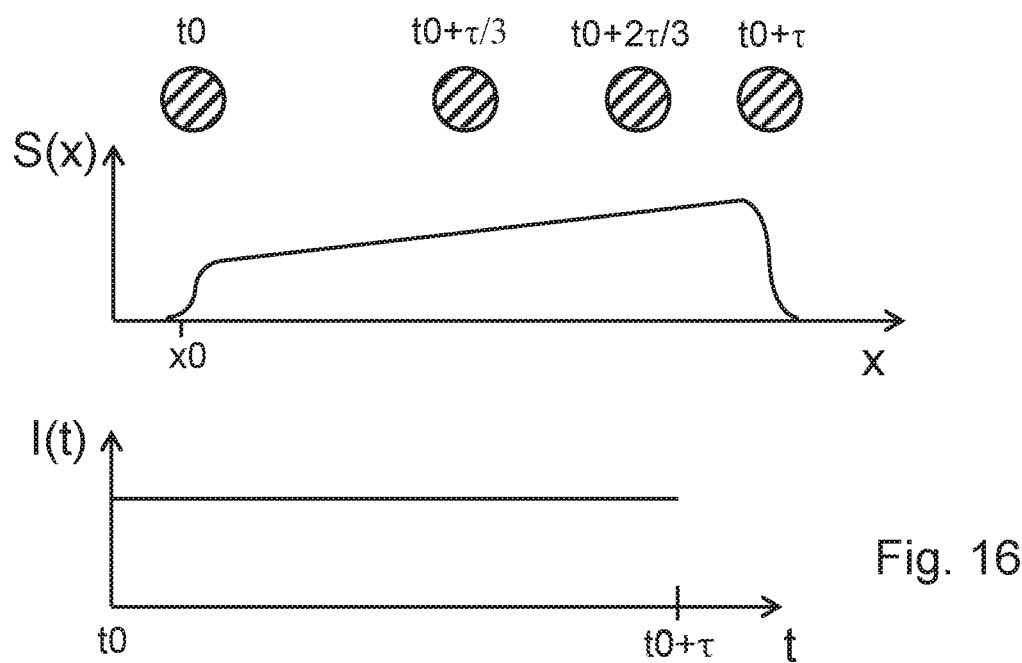
FIG. 16 shows a schematic illustration for a case as in FIG. 15, but with the marker performing a movement in a rectilinear direction at decreasing speed.
Figure 17:
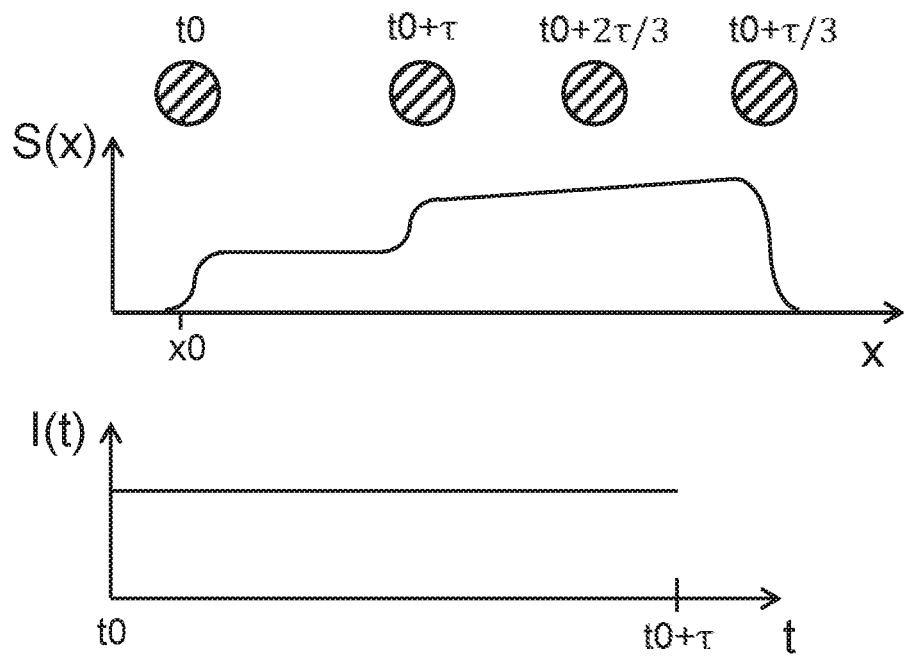
FIG. 17 shows a schematic illustration for a case as in FIG. 15 and FIG. 16, but with the marker performing a movement in a rectilinear direction which is reversed during the exposure time interval, that is to say that the orientation of the movement changes during the exposure time interval.
Figure 18:
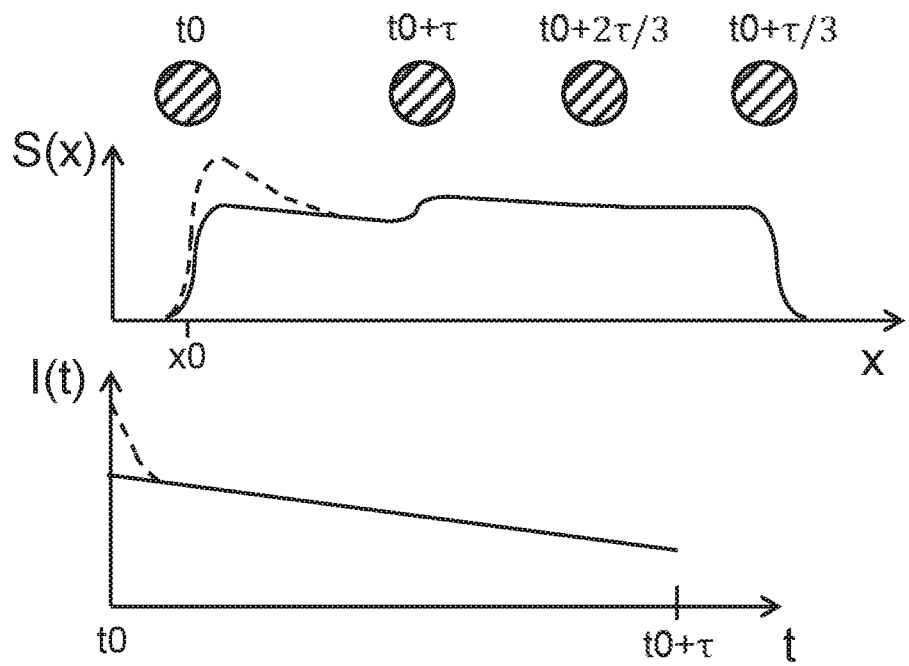
FIG. 18 shows a schematic illustration for a case as in FIG. 17, but with the intensity of the radiation transmitted from the marker to the sensor array of the camera decreasing during the exposure time interval with a constant gradient.

Below the diagram illustrating the received quantity of radiation as a function of the position, in each of FIGS. 15 to 18 there is a further diagram, which illustrates the temporal intensity profile I(t) of the radiation emanating from the marker during the exposure time interval, i.e. the intensity I is a function of time t. In the case of FIGS. 15 to 17, the profile is constant, that is to say that radiation having a radiation intensity that remains constant emanates from the marker during the exposure time interval. In the case of FIG. 18, by contrast, the intensity I(t) falls linearly with a constant slope. In addition, a variant of the temporal intensity profile is indicated by a dashed line in FIG. 18. In accordance with the variant, the intensity is significantly greater at the beginning of the exposure time interval and falls steeply initially so as to then join the profile falling with a constant slope. In the illustration of the received quantity of radiation S(x) that corresponds to a dashed line in the region of the position x0.

In the case of FIG. 15, the marker moves at a constant speed in the x-direction. As mentioned, the temporal profile of the radiation intensity is additionally constant. The quantity of radiation S(x) received by the camera in the exposure time interval has a symmetrical form with respect to the midpoint of the position range in which the marker moves during the exposure time interval. Therefore, with regard to its orientation the movement of the marker cannot be differentiated from the reverse movement of the marker.

This also applies to the case of FIG. 16, in which the marker performs a rectilinear movement in the x-direction that decelerates in the course of the exposure time interval. If the marker instead performs an accelerating movement in the opposite direction, the same quantity of radiation S(x) as a function of the position as illustrated in FIG. 16 can arise.

The conclusion drawn from the cases of FIG. 15 and FIG. 16 can be mathematically substantiated as illustrated below. In this case, reference is made to the above illustration of the gray-scale value distribution GW. The convolution represented in equation (1) is represented in an altered way, however, in order to clarify the substantive matter of the cases in FIG. 15 and FIG. 16. In equation (7) below, the variable I(t) denotes the illumination intensity as a function of time t and the variable σ denotes the position-dependent image function of the capturing structure recorded by the camera image. Since a relative movement between the capturing structure and the camera is involved, the position x changes by the travel s(t) over the course of time, that is to say that the travel s is likewise a function of time:

$$GW(x) = \int_0^T I(t)\sigma(x+s(t))dt \tag{7}$$

If the travel s(t) is designated as a variable u, this results in the following:

$$t = s^{-1}(u) => du = v(t)dt \tag{8}$$

In other words, time t is equal to the inverse function of the travel s as a function of the variable u and from this there follows the expression on the right in equations (8), which equates the infinitesimal value du of the variable u with the first time derivative v of the travel s multiplied by the infinitesimal value dt of time t. From this in turn there follows the following converted expression:

$$\frac{1}{v(s^{-1}(u))} = dt \tag{9}$$

The expressions in equations (8) and (9) can then be inserted into equation (7) in order to substitute time t. In this case, a cessation of the movement and therefore also a change in the direction of movement are not permitted. The first time derivative v of the travel, i.e. the speed, therefore does not become zero:

$$GW(x) = \int_{s(0)}^{s(T)} I(s^{-1}(u))\sigma(x+u)\frac{1}{v(s^{-1}(u))}du \tag{10}$$
$$= \int_{s(0)}^{s(T)} \frac{I(s^{-1}(u))}{v(s^{-1}(u))}\sigma(x+u)du$$
$$= \int_{s(0)}^{s(T)} k(u)\sigma(x+u)du$$

where:

$$k(u) = \frac{I(s^{-1}(u))}{v(s^{-1}(u))}$$

In this case, the first expression k(u), i.e. the fraction, in the integral in equation (10) can be understood as a convolution kernel and operator which brings about the blurring of the capturing structure in the recorded recording image. This expression is referred to hereinafter as blurring operator. In the case of a constant radiation intensity I(t)=1 equation (10) is simplified as follows:

$$GW(x) = \int_{s(0)}^{s(T)} \frac{1}{v(s^{-1}(u))}\sigma(x+u)du \tag{11}$$

From equation (12) below, which is obtained from equation (11) by substitution of the variable u by its negative variable −w (i.e. u=−w and du=−dw), it can be discerned that the orientation of the movement cannot be determined in the case of a constant radiation intensity. This follows from the equality of the expressions on the right-hand sides of equations (11) and (12), wherein the integration limits and the signs before the variables u and w, respectively, are reversed owing to the substitution:

$$GW(x) = \int_{s(T)}^{s(0)} \frac{1}{v(s^{-1}(-w))} \sigma(x-w) dw \qquad (12)$$

Consequently, the substantive matter represented empirically by the cases of FIG. 15 and FIG. 16 is proved mathematically. However, if the radiation intensity I(t) changes over the course of time, the gray-scale value distribution GW(x) can be written as in the second line of equation (10) and the radiation intensity I(t) in the numerator of the fraction (i.e. of the blurring operator) is not constant. Rather, the blurring operator is then dependent on the temporal profile of the radiation intensity and also on the speed of the movement as a function of time, that is to say on the temporal profile of the movement. The blurring operator can be determined from one or a plurality of recording images.

If the blurring operator is determined, the temporal profile of the movement, e.g. the change in speed depending on time, can be determined from said blurring operator. It is already discernible from the expression of the blurring operator in the second line of equation (10) that, with an unknown temporal profile of the radiation intensity and an unknown change in speed, there is an ambiguity between the radiation intensity and the speed profile. This expression can be converted as follows:

$$v(t) = \frac{I(t)}{k(u)}$$

The expression contains both the radiation intensity I and the speed v as a function of time t, that is to say the temporal profiles thereof. If the temporal profile of the radiation intensity is known, however, as is the case here, the only question that remains open is with what orientation the relative movement takes place. Said ambiguity is expressed in the converted expression by the fact that the expression is not only the convolution kernel of the integral in accordance with equation (10), but also that of the corresponding integral with the opposite integration direction and opposite direction of the movement. With the exception of a temporally non-constant radiation intensity I(t) occurring in these two integrals, the latter behave just like the integrals in equations (11) and (12) with respect to one another.

The ambiguity with regard to the orientation can be eliminated, however, even with evaluation of a single recording image if the temporal profile of the radiation intensity is chosen such that, in the case of a theoretically conceivable opposite direction of movement, a non-realistic speed profile of the movement is the consequence. By way of example, it is possible, as has already been mentioned above, and will also be explained with reference to the variant of FIG. 18, that the radiation intensity within a short partial time period at the beginning of the exposure time interval is chosen to be very much greater than during the remainder of the exposure time interval. Illustratively, this process can be referred to as "burning" the object scene into the recording image.

Additional ambiguities with regard to the determination of the orientation and/or the temporal profile of the movement can arise, however, upon the evaluation of just a single recording image if a reversal of the movement takes place during the exposure time interval. This problem can be solved by a solution in which the duration of the exposure time interval is chosen to be short enough and/or, by means of respectively separate evaluation of a plurality of successively recorded recording images, an already determined orientation of the movement is confirmed and/or an already determined temporal profile of the movement is continued in a plausible manner. An additional factor is that information about the inertia of the machine can be found depending on the masses of the moving parts of the machine. Furthermore, taking account of information about the possible drive forces it is possible to determine what dynamic range the movement can have. In this way, unrealistic movement profiles can be excluded from a number of conceivable movement profiles which could have taken place during an exposure time interval.

Figure 19:
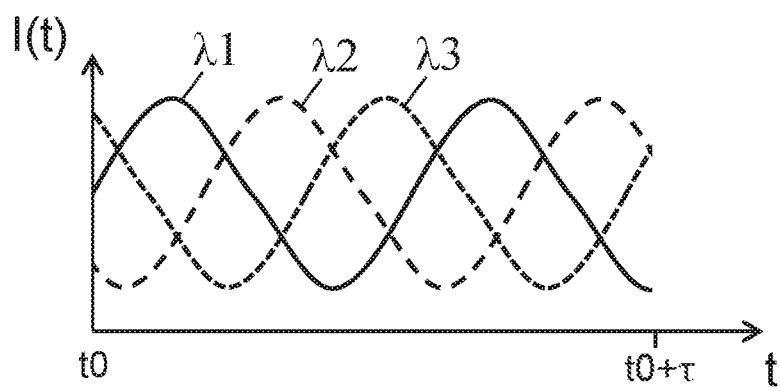
FIG. 19 shows the sinusoidal temporal profile of the intensities of radiation components in three different spectral ranges.

As has likewise already been mentioned above and as will be explained briefly with reference to FIG. 19, it is moreover possible to obtain additional information by means of a single recording image if e.g. the temporal profile of the radiation intensity is varied in different ways in different spectral ranges and/or sensor elements of at least one camera are read with at least two read-out sequences as already described above.

One concrete case for the different temporal variation of the radiation intensity in different spectral ranges is illustrated mathematically on the basis of the following equations. In this case, it is assumed that during the first half of the exposure time interval only the radiation intensity of the first spectral component of the radiation is not equal to zero, and in the second half of the exposure time interval only the radiation intensity of the other, second spectral component is not equal to zero. This has the effect that the blurring of the first spectral component is unambiguously offset relative to the blurring as a result of the other spectral component. While equation (13) below contains only the general index i in the numerator of the blurring operator and correspondingly on the left of the equality sign in the gray-scale value distribution or radiation distribution GW and thus stands for an arbitrary whole number of spectral components $$GW_i(x) = \int_{s(0)}^{s(T)} \frac{I_i(s^{-1}(u))}{v(s^{-1}(u))} \sigma(x+u) du \qquad (13)$$

just two spectral components having the radiation intensity profiles I1(t) and I2(t) are assumed in the concrete example as already described:

$$I1(t) = \begin{cases} 1 & t \in [0, T/2] \\ 0 & \text{otherwise} \end{cases} \qquad (14)$$

$$I2(t) = \begin{cases} 0 & t \in [0, T/2] \\ 1 & \text{otherwise} \end{cases}$$

There follow therefrom equations (15.1) and (15.2) for the intensity distribution of the two spectral components:

$$GW_1(x) = \int_{s(0)}^{s(\frac{T}{2})} \frac{1}{v(s^{-1}(u))} \sigma(x+u) du \qquad (15.1)$$

$$GW_2(x) = \int_{s(\frac{T}{2})}^{s(T)} \frac{1}{v(s^{-1}(u))} \sigma(x+u) du \qquad (15.2)$$

In accordance with equations (15), the first spectral component makes a contribution to the spatial radiation distribution only in the first half of the exposure time interval, i.e. until the point in time T/2, and the second spectral component makes a contribution to the radiation distribution only in the second half of the exposure time interval, beginning at the point in time T/2. It can thus be determined unambiguously with what orientation the movement takes place. The sensor elements of the at least one camera which recorded radiation of the first spectral component captured the capturing structure in the first half of the exposure time interval. The sensor elements which received radiation of the second spectral component, by contrast, captured the capturing structure in the second half of the exposure time interval. From the arrangement of the sensor elements, the orientation of the movement can therefore be determined unequivocally.

There are also other possibilities for implementing the principle of obtaining additional information by different temporal variation of the spectral components of the radiation. In the case of the variation of at least three spectral components $\lambda 1$, $\lambda 2$, $\lambda 3$, as already described above and explained with reference to FIG. 19, the spectral intensities have e.g. in each case a sinusoidal temporal profile, but with a phase offset with respect to one another. In the concrete exemplary embodiment, the frequency of the intensity variation is identical for all three spectral components. FIG. 19 illustrates the intensity profile for the three spectral components in a single exposure time interval. By means of mathematical methods which are known per se and are known by the designation "phase shift" from the field of capturing three-dimensional surface structures, the orientation and/or the temporal profile of the movement can be determined unambiguously from a single recording image if no reversal of the movement has taken place during the exposure time interval. By way of example, Jason Geng in "Structured-light 3D surface imaging: a tutorial", Advances in Optics and Photonics 3, 128-160 (2011) doi: 10.1364/AOP.3.000128, describes one such mathematical method. Other mathematical methods described therein for capturing three-dimensional surface structures can also be applied to the field of application of identifying movements, which is taken as a basis for the present invention.

The substantive matter illustrated above, according to which a temporally constant radiation intensity at any rate in the case of a single marker and a single camera with an identical exposure time interval for all the sensor elements does not enable sufficient information for the determination of the orientation and/or the temporal profile of the movement from a single recording image, is illustrated for a further case in FIG. 17. As already mentioned, a reversal of the movement of the marker additionally takes place in the case of FIG. 17. Proceeding from the position x0—illustrated at the top left in FIG. 17—of the marker at the point in time t0 of the beginning of the exposure time interval, the marker reaches its maximum distance from the position x0 after just one third of the duration of the exposure time interval. In the further course of the movement during the exposure time interval, a movement in the opposite direction takes place, but at a lower speed than in the first third of the exposure time interval. The resulting irradiation quantity S(x) as a function of the position x, which is recorded by the sensor elements, exhibits qualitatively the profile illustrated in the upper diagram of FIG. 17. At the position reached by the marker at the end of the exposure time interval, a rise virtually in the form of a sudden jump in the quantity of radiation S(x) takes place since the marker has passed through or reached this position and all positions further away from the position x0 twice during the exposure time interval.

Although FIG. 18 shows a constantly falling radiation intensity for the same case of the movement of the marker, nevertheless from a single recording image it is not possible to determine unambiguously when the marker moved with what orientation during the exposure time interval. The profile of the quantity of radiation S(x) received by the sensor elements, said profile being represented by a solid line in FIG. 18, is qualitatively similar to the profile shown in FIG. 17. Just the two plateaus of the profile are slightly altered and fall to larger values of x in places, wherein the right-hand plateau initially rises slightly again toward the maximum x-value because the reversal of the movement took place there and the residence duration of the marker there was comparatively long.

However, the variant of the temporal profile of the radiation intensity I(t) that is represented by dashed lines and the resulting variant of the quantity of radiation S(x) show the value of the additionally obtained information if the radiation intensity decreases with a large rate of change over the course of time. The same correspondingly applies to the opposite case of an increase with a large rate of change. The radiation intensity is particularly high in the first tenth of the exposure time interval and this leads to a maximum of the quantity of radiation near the position x0. The information is thus obtained that, with high probability, the marker was situated at this position at the beginning of the exposure time interval.

Figure 20:
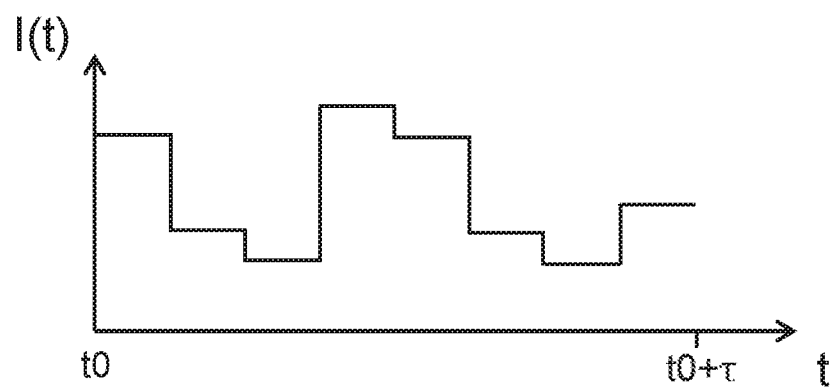
FIG. 20 shows the intensity profile of radiation in the case of a pseudo-random variation of the intensity level.

FIG. 20 shows a pseudo-random variation of the radiation intensity I(t). This can involve the total radiation intensity or some other radiation intensity, e.g. a radiation intensity within a known and/or predefined spectral range of the radiation. Furthermore as an alternative this can involve the radiation intensity of radiation having a specific direction of polarization. By way of example, the radiation intensity within other known and/or predefined spectral ranges of the radiation can likewise be varied pseudo-randomly, specifically with different pseudo-random intensity level jumps in the different spectral ranges of the radiation. The same correspondingly applies to radiation components having other directions of polarization.

The radiation intensity is constant in each case within partial time intervals and, at the end of the partial time interval, jumps in a stepwise manner to a different intensity level. FIG. 20 shows the time period of an exposure time interval between the beginning point in time t0 and the end point in time t0+τ. Within the partial time interval, in the exemplary embodiment there are eight partial time intervals in which the radiation intensity has in each case a constant value.

The pseudo-random intensity distribution is not restricted to eight partial time intervals per exposure time interval, but rather can have any other suitable number and duration of the partial time intervals. Moreover, it is not absolutely necessary for the partial time intervals all to be of the same length. By way of example, in the manner of that profile of the radiation intensity which is designated as a variant in FIG. 18, an individual partial time interval can have a very much higher value of the radiation intensity than the directly adjacent partial time intervals or than all partial time intervals within the same exposure time interval. In this way, in the sense described above, the scene is "burned" into the recording image during this partial time interval.

The invention claimed is:

1. A method for operating a motion-measuring system of a machine, in particular of a coordinate measuring machine or of a machine tool, wherein:
an image recording device arranged on a first part of the machine captures a spatial radiation distribution on the basis of radiation emanating from a second part of the machine and records at least one corresponding recording image of the second part, wherein the first part and the second part are movable relative to one another,
a capturing structure, which is formed by the second part and/or which is arranged on the second part, is captured by the at least one recording image, and
using information about an actual appearance of the capturing structure in a motionless state, a speed of the relative movement of the first part and the second part is determined from differences between the at least one recording image and the actual appearance of the capturing structure, where the differences arise as a result of a temporal profile of the spatial radiation distribution within a recording time interval of a respective recording image during a relative movement of the first part and the second part,
wherein the at least one recording image is captured by a digital camera that comprises a plurality of sensor elements, each sensor element producing one pixel of the respective recording image by integrating impinging radiation of the spatial radiation distribution over an exposure time interval of the respective recording image,
wherein the differences arise because the radiation impinging on at least some of the sensor elements varies over the exposure time interval due to the relative movement and the pixels produced by each of the at least some of the sensor elements as well as image regions comprising a plurality of these pixels are therefore different from local areas of the capturing structure in the motionless state,
wherein the information about the actual appearance of the capturing structure comprises a reference image of the capturing structure,
wherein the speed of the relative movement is determined by evaluating differences between the reference image and the at least one recording image recorded by the image recording device, and
wherein, by performing a mathematical convolution of the reference image with a region of the at least one recording image in which the capturing structure is imaged, a convolution kernel of the convolution is determined and the speed of the relative movement is determined from the convolution kernel.

2. The method as claimed in claim 1, wherein:
the convolution kernel is interpreted as a geometric structure whose external dimensions correspond to the external dimensions of the reference image and the external dimensions of the region of the at least one recording image in which the capturing structure is imaged, and
the speed of the relative movement is determined from at least one geometric property of a partial structure of the convolution kernel.

3. The method as claimed in claim 2, wherein:
the at least one recording image and the reference image are two-dimensional images, and
an absolute value and/or a direction of the speed of the relative movement are/is determined from a geometry of the partial structure of the convolution kernel.

4. A method for operating a motion-measuring system of a machine, in particular of a coordinate measuring machine or of a machine tool, wherein:
an image recording device arranged on a first part of the machine captures a spatial radiation distribution on the basis of radiation emanating from a second part of the machine and records at least one corresponding recording image of the second part,
the first part and the second part are movable relative to one another,
a capturing structure, which is formed by the second part and/or which is arranged on the second part, is captured by the at least one recording image,
using information about an actual appearance of the capturing structure in a motionless state, a speed of the relative movement of the first part and the second part is determined from differences between the at least one recording image and the actual appearance of the capturing structure,
the differences arise as a result of a temporal profile of the spatial radiation distribution within a recording time interval of a respective recording image during a relative movement of the first part and the second part, and
the capturing structure is a structure whose position function transformed into the frequency domain has function values greater than zero within a frequency range that begins at a frequency greater than zero and that ends at a predefined maximum frequency.

5. The method as claimed in claim 4, wherein the predefined maximum frequency is predefined such that it is not less than the Nyquist frequency of the image recording device.

6. The method as claimed in claim 4, wherein the function values of the position function of the capturing structure transformed into the frequency domain are greater than a predefined minimum value in-throughout an entirety of the frequency range.

7. The method as claimed in claim 6, wherein the predefined minimum value is greater than a statistical fluctuation amplitude of image values of the at least one recording image, the statistical fluctuation amplitude being brought about by the recording of the at least one recording image and by a determination of the speed.

8. The method as claimed in claim 4, wherein the function values of the position function of the capturing structure transformed into the frequency domain are constant throughout an entirety of the frequency range.

9. In a method for operating a motion-measuring system of a machine, in particular of a coordinate measuring machine or of a machine tool, wherein:
an image recording device arranged on a first part of the machine captures a spatial radiation distribution on the basis of radiation emanating from a second part of the machine and records at least one corresponding recording image of the second part,
the first part and the second part are movable relative to one another,
a capturing structure, which is formed by the second part and/or which is arranged on the second part, is captured by the at least one recording image,
using information about an actual appearance of the capturing structure in a motionless state, a speed of the relative movement of the first part and the second part is determined from differences between the at least one recording image and the actual appearance of the capturing structure, and the differences arise as a result of a temporal profile of the spatial radiation distribution within a recording time interval of a respective recording image during a relative movement of the first part and the second part;

a method for producing the capturing structure which is usable or is used in the method for operating the motion-measuring system of the machine, wherein dimensions of structure elements of the capturing structure are chosen depending on a magnitude of an expected speed of the relative movement of the first part and of the second part of the machine.

* * * * *